US008892221B2

(12) United States Patent
Kram et al.

(10) Patent No.: US 8,892,221 B2
(45) Date of Patent: Nov. 18, 2014

(54) INTEGRATED RESOURCE MONITORING SYSTEM WITH INTERACTIVE LOGIC CONTROL FOR WELL WATER EXTRACTION

(75) Inventors: Mark Kram, Santa Barbara, CA (US); Hugo Loaiciga, Goleta, CA (US)

(73) Assignee: Groundswell Technologies, Inc., Santa Barbara, CA (US)

( * ) Notice: Subject to any disclaimer, the term of this patent is extended or adjusted under 35 U.S.C. 154(b) by 997 days.

(21) Appl. No.: 12/952,504

(22) Filed: Nov. 23, 2010

(65) Prior Publication Data

US 2011/0106317 A1 May 5, 2011

Related U.S. Application Data

(63) Continuation-in-part of application No. 11/857,354, filed on Sep. 18, 2007, now abandoned.

(51) Int. Cl.
| | | |
|---|---|---|
| *E21B 43/12* | (2006.01) | |
| *G05B 13/04* | (2006.01) | |
| *G06Q 10/06* | (2012.01) | |
| *G06Q 10/04* | (2012.01) | |
| *G06Q 50/06* | (2012.01) | |

(52) U.S. Cl.
CPC ............. *G06Q 10/06* (2013.01); *G06Q 10/04* (2013.01); *G06Q 50/06* (2013.01)
USPC .......................... 700/51; 210/170.07; 703/10

(58) Field of Classification Search
CPC ....... G06Q 10/04; G06Q 10/06; G06Q 50/06; G05B 13/00; G05B 13/027; G05B 13/04–13/042; G05B 23/0202; E21B 43/12; E21B 2043/12; E21B 3/00
USPC .............. 700/28–31, 47–51, 95, 97, 99–102, 700/117; 706/14–19; 340/870.01–870.07, 340/870.09, 870.11, 500, 540, 603–606, 340/612, 616, 618; 210/170.01, 170.07; 703/10
See application file for complete search history.

(56) References Cited

U.S. PATENT DOCUMENTS

| | | | | |
|---|---|---|---|---|
| 4,835,687 | A * | 5/1989 | Martin .......................... | 705/7.37 |
| 5,639,380 | A * | 6/1997 | Misquitta ...................... | 210/739 |
| 5,992,519 | A * | 11/1999 | Ramakrishnan et al. | 166/250.15 |
| 6,108,590 | A * | 8/2000 | Hergert ......................... | 700/284 |
| 6,178,393 | B1 * | 1/2001 | Irvin ............................. | 703/10 |
| 6,192,980 | B1 * | 2/2001 | Tubel et al. .................. | 166/65.1 |
| 6,325,093 | B1 * | 12/2001 | Ooshima ....................... | 137/392 |
| 6,581,027 | B1 * | 6/2003 | Sheer et al. ...................... | 703/9 |
| 6,829,566 | B2 * | 12/2004 | Sage ............................. | 702/183 |
| 6,845,336 | B2 * | 1/2005 | Kodukula et al. ............. | 702/118 |

(Continued)

*Primary Examiner* — M. N. Von Buhr
(74) *Attorney, Agent, or Firm* — Felix L. Fischer

(57) ABSTRACT

A system for resource usage optimization employs an automatically controlled sensor suite providing data to a computer system for the analysis of spatial relationships of the sensors and resources. A control module incorporates an interactive logic, in an exemplary embodiment of well-stream coupled dynamic or game theory engines, operating in conjunction with the spatial data processing algorithms, GIS in an exemplary embodiment, receives as an input an objective function set for the use of the resource and constraint sets which are then monitored by the sensor suite. Incoming data is compared to the constraint sets and upon impact to any of the elements of the objective function set, creates a report/alarm for action or to trigger a corrective action.

19 Claims, 18 Drawing Sheets
(14 of 18 Drawing Sheet(s) Filed in Color)

(56) References Cited

U.S. PATENT DOCUMENTS

| | | | | |
|---|---|---|---|---|
| 6,901,391 B2* | 5/2005 | Storm et al. | | 706/16 |
| 6,915,211 B2* | 7/2005 | Kram et al. | | 702/5 |
| 6,980,940 B1* | 12/2005 | Gurpinar et al. | | 703/10 |
| 7,010,394 B1* | 3/2006 | Runge et al. | | 700/284 |
| 7,016,742 B2* | 3/2006 | Jarrell et al. | | 700/28 |
| 7,062,358 B2* | 6/2006 | Larsson et al. | | 700/282 |
| 7,079,952 B2* | 7/2006 | Thomas et al. | | 702/13 |
| 7,434,619 B2* | 10/2008 | Rossi et al. | | 166/250.15 |
| 7,684,901 B2* | 3/2010 | Buettner et al. | | 700/291 |
| 7,752,023 B2* | 7/2010 | Middya | | 703/10 |
| 8,306,801 B2* | 11/2012 | Nunez et al. | | 703/10 |
| 2002/0153137 A1* | 10/2002 | Ziauddin et al. | | 166/250.01 |
| 2003/0009241 A1* | 1/2003 | Kruger et al. | | 700/44 |
| 2003/0145646 A1* | 8/2003 | Henry et al. | | 73/19.1 |
| 2003/0154056 A1* | 8/2003 | Ito et al. | | 702/188 |
| 2004/0040746 A1* | 3/2004 | Niedermayr et al. | | 175/38 |
| 2004/0148147 A1* | 7/2004 | Martin | | 703/10 |
| 2004/0156681 A1* | 8/2004 | Aughton et al. | | 405/52 |
| 2004/0163806 A1* | 8/2004 | Hadley | | 166/250.03 |
| 2005/0188758 A1* | 9/2005 | Yekutiely et al. | | 73/152.18 |
| 2005/0246104 A1* | 11/2005 | De Guzman et al. | | 702/6 |
| 2006/0184473 A1* | 8/2006 | Eder | | 706/20 |
| 2006/0276938 A1* | 12/2006 | Miller | | 700/295 |
| 2007/0081582 A1* | 4/2007 | Ginis et al. | | 375/222 |
| 2007/0087756 A1* | 4/2007 | Hoffberg | | 455/450 |
| 2007/0087758 A1* | 4/2007 | Norris et al. | | 455/456.1 |
| 2007/0192072 A1* | 8/2007 | Cullick et al. | | 703/10 |
| 2007/0199721 A1* | 8/2007 | Givens et al. | | 166/382 |
| 2007/0271077 A1* | 11/2007 | Kosmala et al. | | 703/5 |

* cited by examiner river x-section looking downstream
numbered stations correspond to highest water level $h_1$
x = horizontal coordinate; y = vertical coordinate
h = water elevation

INTEGRATED RESOURCE MONITORING SYSTEM WITH INTERACTIVE LOGIC CONTROL FOR WELL WATER EXTRACTION

REFERENCES TO RELATED APPLICATIONS

This application is a continuation-in-part of application Ser. No. 11/857,354 filed on Sep. 18, 2007, now abandoned, having the same title and common inventors with the present application, the disclosure of which is incorporated herein fully by reference.

BACKGROUND OF THE INVENTION

1. Field of the Invention

This invention relates generally to the field of automated systems for monitoring of resource usage and particularly to a system employing an interactive logic control with objective functions and constraint sets as inputs for real time status output with warning/alarm capability.

2. Description of the Related Art

Over-pumping of ground water is becoming more and more commonplace. This is especially true in arid regions of the Southwest United States. A recent GAO report claims that 36 states will encounter severe water shortages within only a few years. *U.S. Government Accountability Office, Freshwater Supply: States' Views How Federal Agencies Could Help Them Meet the Challenges of Expected Shortages*," GAO-03-514, July 2003, p 1). Since many water supply well fields are installed adjacent to areas of shallow surface water, significant impairment to adjacent riparian habitat can result from ground water extraction activities. Reduction in the ground water potentiometric surface due to over-pumping can induce leakage of the surface water body, thereby reducing the total amount of flow in rivers, streams, and springs. Stream flow reduction during fish migration seasons threatens the species survival potential. The methods covered in the patent application are applicable to predicting the effects of groundwater extraction on aquifer storage in general and on seawater intrusion in coastal aquifers.

Cooperative equilibrium arises when ground water users respect environmental constraints and consider mutual impacts, which allows them to derive economic and environmental benefits from ground water indefinitely, that is, to achieve sustainability. For cooperative equilibrium to hold, however, enforcement must be effective. Otherwise, according to the Commonized Costs-Privatized Profits (or CCPP) paradox, there is a natural tendency towards non-cooperation and non-sustainable aquifer mining, of which overdraft is a typical symptom. This would be exemplified by overdraft of a water-bearing zone adjacent to a river, thereby depleting the river of volume and ecologic functionality. Non-cooperative behavior arises when at least one ground water user neglects the externalities of his adopted ground water pumping strategy. In general, non-cooperative behavior results from lack of consideration regarding the interactions between the localized surface and ground water resources due to lack of information.

There is a significant need to better understand the ecological impacts due to ground water extraction activities adjacent to rivers, streams and springs. An automated interactive monitoring and modeling system will provide watershed managers with continuous understanding of the dynamic interactions between ground water extraction activities and surface water levels, and will allow for automated establishment of maximum allowable extraction thresholds based on minimum surface water level requirements, and therefore lead to optimization of ground water extraction activities while protecting the riparian habitat.

It is therefore desirable to provide systems and methods to optimize, monitor, and manage ground water resources based on the integration of sensors with computing capability incorporating an understanding of the ground water and surface water relationships. The methods of this patent application are applicable to predicting and controlling the effects of groundwater extraction on aquifer storage in general and seawater intrusion in coastal aquifers, also.

SUMMARY OF THE INVENTION

The present invention is a system for resource usage optimization employing an automatically controlled sensor suite providing data to a computer system for the analysis of spatial relationships of the sensors and resources. A control module incorporating an interactive logic, in an exemplary embodiment of well-stream coupled dynamic or game theory engines, operating in conjunction with the spatial data processing algorithms, GIS in an exemplary embodiment, receives as an input an objective function set for the use of the resource and constraint sets which are then monitored by the sensor suite. Incoming data is compared to the constraint sets and upon impact to any of the elements of the objective function set, creates a report/alarm for action or to trigger a corrective action.

In an enhanced embodiment, the sensor suite input data is provided to a constraint sets calculator for update of the constraint set assumptions for remodeling of interactive logic calculations. Tracking of input, output and relationships with thresholds over time is also accomplished.

As an exemplary embodiment, a system incorporating the invention is employed for well water monitoring on one or multiple wells drawn upon for either municipal or agricultural use by multiple users. The objective functions for the interactive logic modeling system allow maximizing the water withdrawal capability in the most economically efficient manner by multiple users while avoiding salt water intrusion into the well from overdraw conditions or exceeding a river water level minimum, the latter relying of coupled dynamic interaction algorithm for well-stream systems. The constraint sets preloaded into the model include response of the aquifer modeled from static data including historical permeability and storage capacity, flow rates and water table level history. The sensor suite monitors flow rate(s) and well level. In one exemplary embodiment, Game Theory employed as the interactive logic establishes the optimum flow rates for the desired economic maximization. Flow rate monitoring may be accomplished at both the withdrawal well and aquifer replenishment sources including monitoring wells surrounding the extraction well or feeding stream flow rates for update to the constraint data on flow rates, etc. Water table level (at the feed well and monitoring wells), river level, etc. data from the sensor suite is used to validate/update the constraints for the Game Theory for closed loop operation.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features and advantages of the present invention will be better understood by reference to the following detailed description when considered in connection with the accompanying drawings wherein:

FIGS. 5D-5F are examples of well data entered and displayed for a set of wells in an exemplary system implementation;

DETAILED DESCRIPTION OF THE INVENTION

Figure 1:
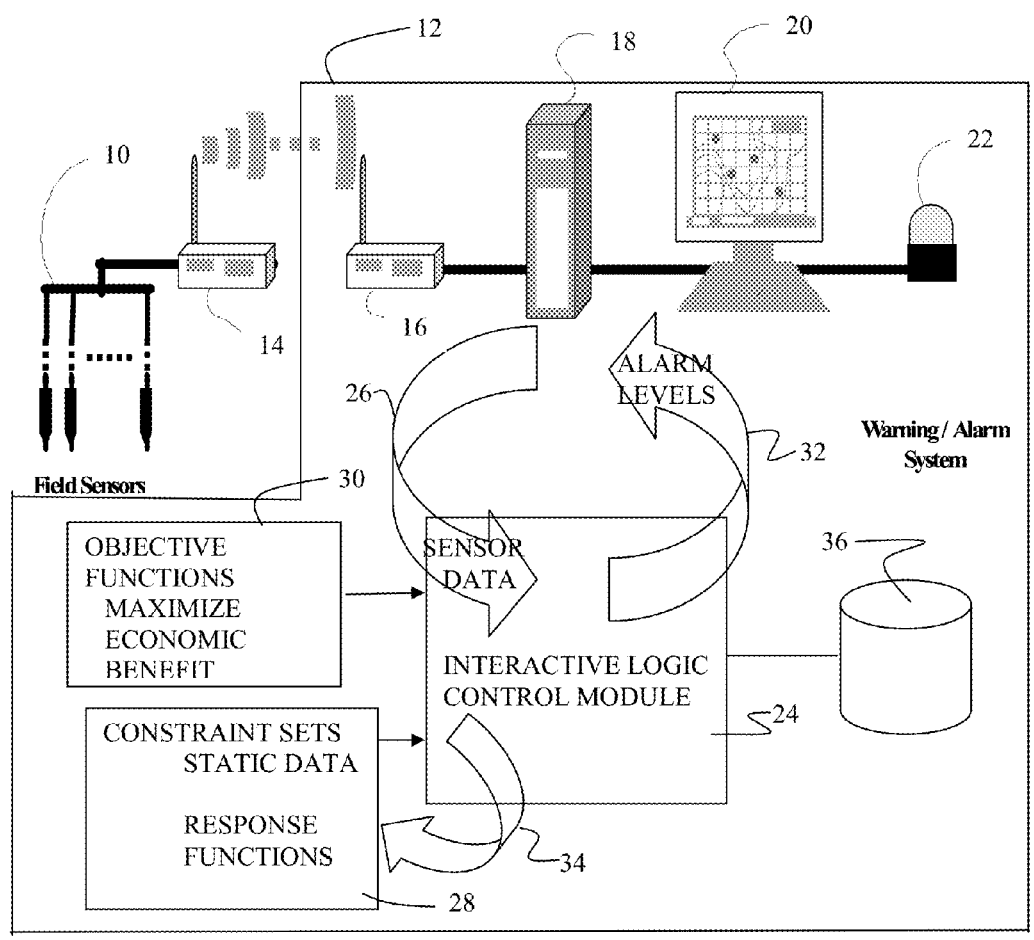
FIG. 1 is a block diagram showing the physical elements of an exemplary embodiment and its functional control elements.

Referring to the drawings, FIG. 1 shows the elements of an embodiment of the present invention. Field sensors 10 are placed at the various physical features which are to be measured such as wells, streams or aquifers. The sensors themselves may include such devices as flow meters, temperature sensors, pH sensors, dissolved oxygen sensors and level sensors which indicate the condition of the physical feature under study. By the nature of the desired system effectiveness, multiple physical features will be monitored resulting in multiple sets of field sensors. In most cases the field sensors will be remote from the control center generally designated as 12 which houses the control and reporting elements of the system and telemetric systems such as transmitters 14 at or near each physical feature and receivers 16 residing at the location of the control center. The representation in the drawings provides for radio transmission, however, in actual embodiments telemetry transmission approaches may be of any applicable form known to those skilled in the art. Automated control of the multiple sensor suites is implemented in exemplary embodiments as disclosed in U.S. Pat. No. 6,915,211 issued on Jul. 5, 2005 entitled GIS BASED REAL-TIME MONITORING AND REPORTING SYSTEM the disclosure of which is incorporated herein by reference.

A computer 18 for processing of the telemetered sensor data is provided including integrated Geographic Information System (GIS) capability or other automated spatial data processor for calculation of geographically dependent parameters based on location of the physical features. A display 20 is provided as shown in the figure and may include multiple physical display screens or elements distributed for monitoring and decision making based on system output as will be described subsequently. In addition to the display(s) or as an integral presentation on the display(s) a warning/alarm system 22 is provided. In alternative embodiments, automatic dialing of telecommunications devices such as cell phones or pagers is also accomplished.

An interactive logic control module 24 operates on the computer receiving sensor data 26 as processed. The control module operates based on input from constraint sets 28 which may include static data and response functions measured with respect to the physical features under study. The discussion of the embodiments disclosed herein emphasizes economic benefit, but most often will be set to physical tolerances such as threshold water levels in actual physical operations. Additionally, the control module incorporates in its operation objective functions 30 predetermined by the system user. These objective functions may include such elements as maximizing the economic benefit of the overall use of the physical features as will be described in greater detail subsequently. The control module provides alarm levels 32 for activation of the warning/alarm system based on the calculations performed. Additionally, the sensor data received is provided in certain embodiments as feedback 34 to update the constraint sets. Modeled and actual data is stored by the control module in storage 36 for constraints assessment and modification as will be described subsequently.

A first exemplary use of the system is demonstrated in FIG. 2 for monitoring the impact of multiple wells 40, 42 and 44 in distributed locations where drawdown on the wells may impact a nearby hydraulically connected stream 46. The system incorporates field sensors including flow rate and level sensors 48a, 48b and 48c at each of the wells. A flow regulator 50a, 50b and 50c at each well may be employed for control feedback as will be described subsequently. The system also incorporates field sensors associated with the stream including level sensors 52, 54 and 56 located along the stream length. As shown, the field sensors provide their data to the control center system 12.

The data provided for active monitoring by the field sensors and the constraint sets employed by the control module includes the locations (x, y) of the extraction wells in a geo-referenced coordinate system; stream layout in the geo-referenced coordinate system; transmissivity and storativity associated with the stream, wells and intervening geological formations; total streamflow at a given time (tracked via level monitoring), current water depth, temperature provided by the associated field sensors; channel and overbanks' roughness; stream cross section and longitudinal profile in the reach affected by the wells; pumping well characteristics; historical pumping rates; and immediate flow rates of the wells.

Objective functions input to the control module may include such elements stream depletion regulations as limitations to assure that the stream level remains above a safe threshold (habitat sustainability) during ground water extraction by the wells under study. The data collected is applicable for use in determining current use limitations and future expansion potential.

The control module calculates the fraction of each well's pumping rate drawn from the stream and calculates the total volume of streamflow draft from the multiple wells simultaneously. Based on the constraint data, the system then estimates maximum pumping rate(s) allowed given permissible streamflow depletion. This constraint data may be obtained through trial-and-error with multiple outputs possible from the control module. In an exemplary application, the system compares extraction rates to optimal rates and provides a data output.

Figure 2A:
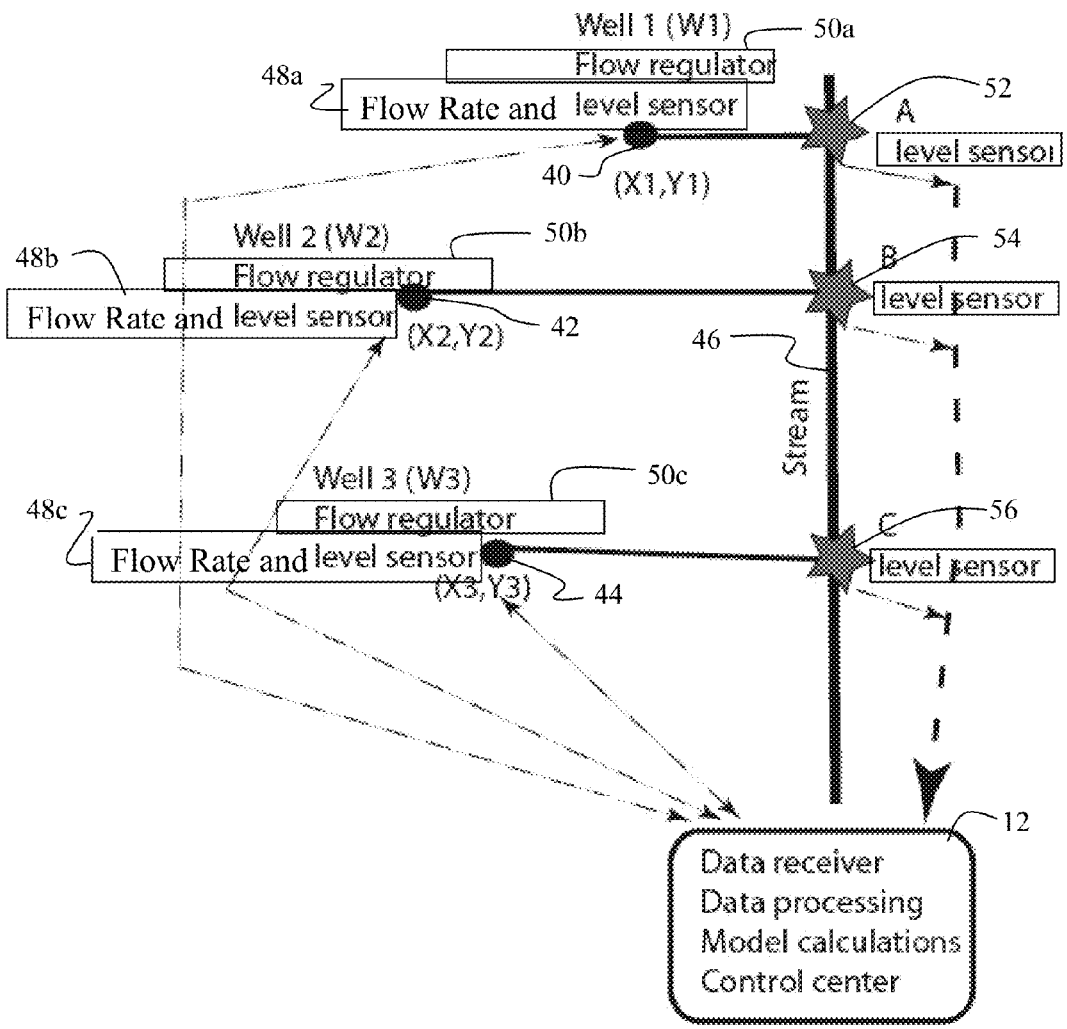
FIG. 2A is a block diagram of a first exemplary implementation for impact of multiple drawdown wells on a stream.
Figure 2B:
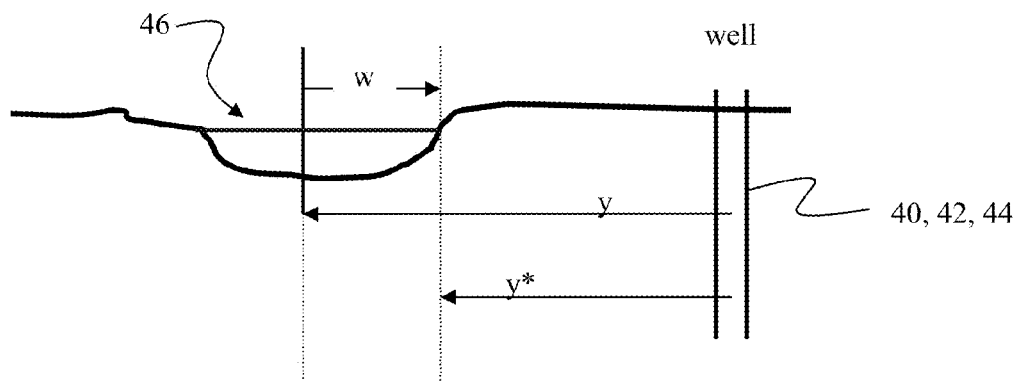
FIG. 2B is a profile of an exemplary river cross section and the distances from system wells.
Figure 2C:
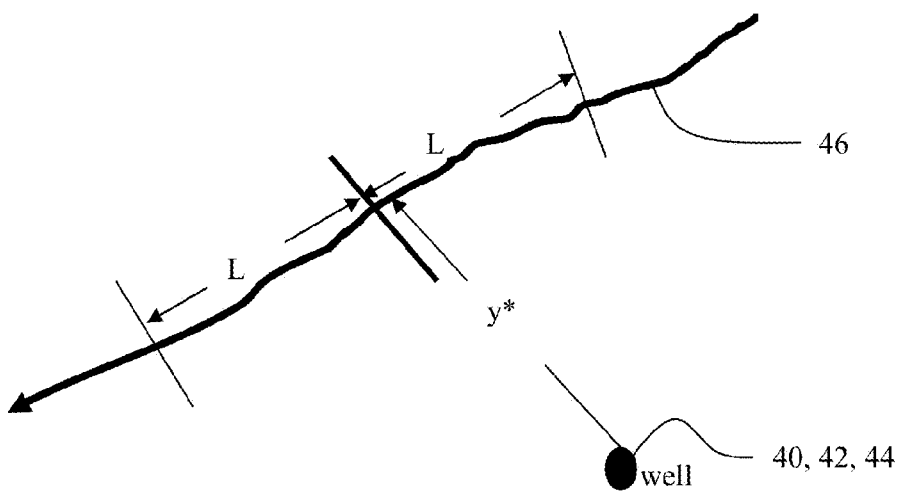
FIG. 2C is a plan view of a reach of the exemplary river with calculation distances.

In an exemplary system for this embodiment, rating curves and wetted width equations are employed for calculation of stream impacts. The rating curve equation employed in the embodiment is of the form:

$$Q = ad^b$$

in which Q is the flow rate (in ft$^3$/s or m$^3$/s) at a specified cross-section in the river as represented in FIG. 2B; d=the depth of water (feet or meters) at the level-monitoring location in the specified cross-section; a and b are fitting parameters that are determined based on surveyed cross-section. Note that the coefficient a, b vary as the system of units changes from customary US units (feet, pound, second) to metric system of units (meter, kilogram, second).

The depth of water d equals:

$$d = h - h_R \quad (2)$$

in which h is the absolute water level at the specified cross section above mean sea level and $h_R$ is the elevation of the stream bottom at the location where level monitoring takes place in the cross section.

The partial wetted width (w), as seen in FIG. 2B, of the river at a specified cross section depends on the depth of water d, also, and the equation for w is of the form:

$$w = cd^f \quad (3)$$

in which c and f are parameters determined by field surveying.

The shortest straight distance y* between the wetted bank of the river at the specified cross section and the well equals the total distance between the water-level sensor in the cross section and the well (y) minus w:

$$y^* = y - w \quad (4)$$

Equations of the type (1)-(4) for each river cross section where monitoring takes place are employed as a portion of the constraint sets for the system.

An exemplary equation to calculate the flow rate (q) captured by a well pumping at a rate ($Q_w$) a straight (shortest) distance y* from river cross section may employ solutions such as "Transient ground water hydraulics", by Robert E. Glover, Dept. of Civil Engineering, College of Engineering, Colorado State University, 1974 for stream depletion by a well:

$$q = Q_w \frac{2y^*}{\pi} \int_0^L \frac{e^{-\left(\frac{x^2 + y^{*2}}{4\frac{T}{S}t}\right)}}{x^2 + y^{*2}} dx \quad (5)$$

with symbols defined below.

The equation for q given $Q_w$, y*, time of elapsed pumping t, aquifer parameter $\alpha = T/S$, where T is the transmissivity and S the storativity is.

$$0 \le q \cong Q_w \frac{2y^*}{\pi} \sum_{j=1}^{j=5} \frac{L}{2} w_j F(z_j) < Q_w, Q \quad (6)$$

For the equation, q equals zero when the depth of water (d) is zero. Also, q cannot exceed the pumping rate $Q_w$ nor the streamflow Q. The quadrature weights $w_j$ and evaluation points $z_j$ as defined by Karl F. Gauss, as referenced in *Applied Numerical Methods*, by Carnahan et al., 1969, McGraw Hal, are as shown in Table 1.

TABLE 1

| Index j | Weight $w_j$ | Evaluation points $z_j$ |
|---|---|---|
| 1 | 0.56888889 | 0.00000000 |
| 2 | 0.47862867 | 0.53846931 |
| 3 | 0.47862867 | −0.53846931 |
| 4 | 0.23692689 | 0.90617985 |
| 5 | 0.23692689 | −0.90617985 |

The function F evaluated at $z_j$, or $F(z_j)$ in equation (6), is as follows:

$$F(z_j) = \frac{e^{-\frac{[\frac{L}{2}(z_j+1)]^2 + y^{*2}}{4\alpha t}}}{\left[\frac{L}{2}(z_j+1)\right]^2 + y^{*2}} \quad (7)$$

Where L is the distance of influence upstream and downstream the cross section where the water-level monitoring is implemented. See FIG. 2C.

Equations (6) and (7) are then calculated by the system for each cross section where water-level monitoring occurs.

The effect of well influence superposition, as will be described in greater detail subsequently, is also assessed based on the locations of monitored wells along the stream.

Specification of flow requirement and maximum allowable pumping rate can then be determined based on various imposed constraints. As exemplary, velocity, temperature, oxygen regulations to preserve fish habitat may result in a minimum amount of streamflow, $Q_{min}$, specified in a reach. The streamflow in the reach minus the amount of it captured by a nearby well (q) may not exceed $Q_{min}$. At equality, $$Q - q = Q_{min} \quad (8)$$

solving for q in equation (8) and then approximating q by the expression appearing in equation (6) produces the maximum pumping rate compatible with minimum fish-flow requirement:

$$Q_w = \frac{Q - Q_{min}}{\frac{2y^*}{\pi} \sum_{j=1}^{j=5} \frac{L}{2} w_j F(z_j)} \quad (9)$$

The ability to introduce various constraint sets into the system models allows greater complexity in the stream profile to be considered. Using FIG. 2D which is exemplary of detailed streambed field surveying. The water width W of the water surface at a height h (shown as h1, h2, h3, h4 or h5) is given by:

$$W = \sum_{j=2}^{n} (x_j - x_{j-1}) \tag{10}$$

The wetted perimeter WP (the length of the bottom of the x-section under water on the plane of the Figure) is given by (with n=the number of river stations):

$$WP = \sum_{j=1}^{n} \sqrt{(x_j - x_{j-1})^2 + (y_j - y_{j-1})^2} \tag{11}$$

Wetted area (A) of the (vertical) x-section under water (with n the number of river stations):

$$A = \frac{1}{2}(x_n - x_1)(y_n + y_1) - \frac{1}{2}\sum_{j=2}^{n} (x_j - x_{j-1})(y_j + y_{j-1}) \tag{12}$$

Hydraulic radius $R = A/WP$ (13)

Hydraulic depth $D = A/W$ (14)

Depth of water at the water-level monitoring location
$d = h - y4$ (15)

Figure 2D:
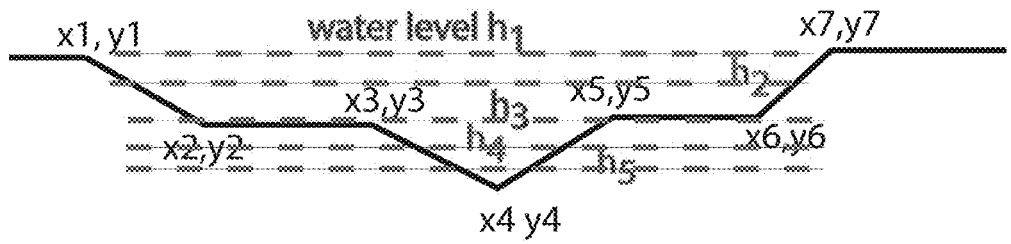
FIG. 2D is a detailed section view of the river cross section for water level monitoring with a multiple exemplary water level.

At a water level at or below the top terraces as shown in FIG. 2D, levels h1 or h2, the first and last stations are now coincident with the left and right intersections of the wetted perimeter by the water surface at h. The total number of stations is 7 in this example.

The water width W (of the water surface at h2) is given (with n=7) by:

$$W = \sum_{j=2}^{n} (x_j - x_{j-1}) \tag{10}$$

The wetted perimeter WP (the length of the bottom of the x-section under water on the plane of the Figure) is given by (with the number of river stations n=7):

$$WP = \sum_{j=1}^{n} \sqrt{(x_j - x_{j-1})^2 + (y_j - y_{j-1})^2} \tag{11}$$

Wetted area (A) of the (vertical) x-section under water (with n=7):

$$A = \frac{1}{2}(x_n - x_1)(y_n + y_1) - \frac{1}{2}\sum_{j=1}^{n} (x_j - x_{j-1})(y_j + y_{j-1}) \tag{12}$$

Again, Hydraulic radius $R$: $R = A/WP$ (13)

Hydraulic depth $D = A/W$ (14)

Depth of water at the water-level monitoring location
$d = h2 - y4$ (15)

With water level in the lowest part of the stream channel at height h4, the water width W (of the water surface at h) is given by (with n=3, the number of river stations), W is again calculated using equation (10). The wetted perimeter WP (the length of the bottom of the x-section under water on the plane of the Figure) is given by Equation (11) (with the number of river stations n=3). Wetted area (A) of the (vertical) x-section under water is given by equation (12) (with the number of river stations n=3) with variables R, and D given by equations (13) and (14), respectively Depth of water at the water-level monitoring location is give by $d = h4 - y2$ At least five water levels (h) entertained in the exemplary system and for each of these the width (W), wetted perimeter (WP), wetted area (A), hydraulic radius (R), the hydraulic depth (D), and depth of water at the water-level monitoring station (d) are calculated. The water levels, h, are chosen to give a representative variation of the variables W, WP, A, R, D, and d as a function of water level rise.

Again calculating flow rates, from the Manning's equation for the exemplary embodiment, the flow rate Q (in m³/s) through the cross section is written as a power law in terms of the hydraulic depth (D) corresponding to an arbitrary water level h:

$$Q = a^* D^{b^*} \tag{18}$$

in which:

$$a^* = \frac{1}{n} \frac{W^{5/3}}{WP^{2/3}} \sqrt{S_f} \tag{19}$$

and $b^* = 5/3$.

In equation (19) n=Manning's roughness coefficient which determined from field observations and provided as a constraint; W=water surface width corresponding to water level h; WP=wetted perimeter corresponding to water level h, these last two computable from equations given above (see equations (10) and (11), for example); $S_f$ is the friction slope or energy-tine slope. $S_f$ cannot be determined in general unless Q is known, which, in turn, is unknown in this application thus creating a circular and unbreakable chain of dependency. For this reason $S_f$ is approximated by the slope of the stream thalweg, which is the drop of elevation of the thalwed ($\Delta H$) with distance measured along the thalweg ($\Delta L$). $\Delta H$ and $\Delta L$ would be measured in the field to approximate the friction slope:

$$S_f \cong \frac{\Delta H}{\Delta L} \tag{20}$$

To express the flow rate Q in terms of the depth of water at the water-level monitoring station by returning to equation (1), $$Q = a d^b \tag{1}$$

a regression of values of D vs. values of d is conducted, where at least five pairs of values (d,D) are available from the calculations carried out for several water levels described above. A power law provides an accurate fit of D as a function of d:

$$D \cong a_1 d^{b_1} \tag{21}$$

Combining equations (18), (19), and (20) the flow rate Q is given by equation (1) with coefficients:

$$a = a^* a_b^{b^*} \tag{22}$$

$$b = b_1 b^* \tag{23}$$

where a* is given by equation (19); b*=5/3, and $a_1$, $b_1$ stem from the regression (21).

Figure 2E:
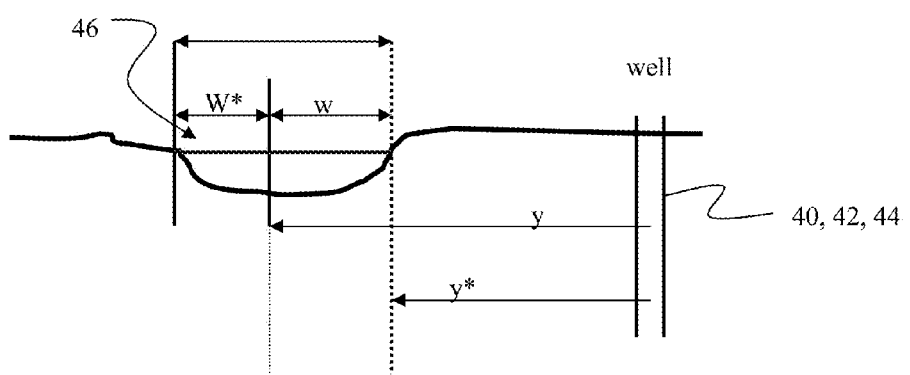
FIG. 2E is a profile of an exemplary river cross section and the distances from system wells with definition of partial wetted depth.

Recalling FIG. 2B and the previous description of the calculate the flow rate Q, the partial wetted depth w, and the capture of streamflow by a well, referring now to FIG. 2E, calculation of the partial wetted depth by the equation can be accomplished $$w = W - W^* = \left[\sum_{j=2}^{n}(x_j - x_{j-1})\right] - W^* \tag{24}$$

where $$y^* = y - w \tag{4}$$

Recall that it is y* what is needed in the stream-well interaction equations.

Nevertheless, if desired, one can regress w against d from the pairs of values (w, d) that can be obtained from the calculations carried out for several water levels h. This produces an accurate power law expressing w as a function of water depth d:

$$w = cd^f \tag{3}$$

which is one of equations appearing in the stream-well interaction algorithm previously discussed.

Figure 3:
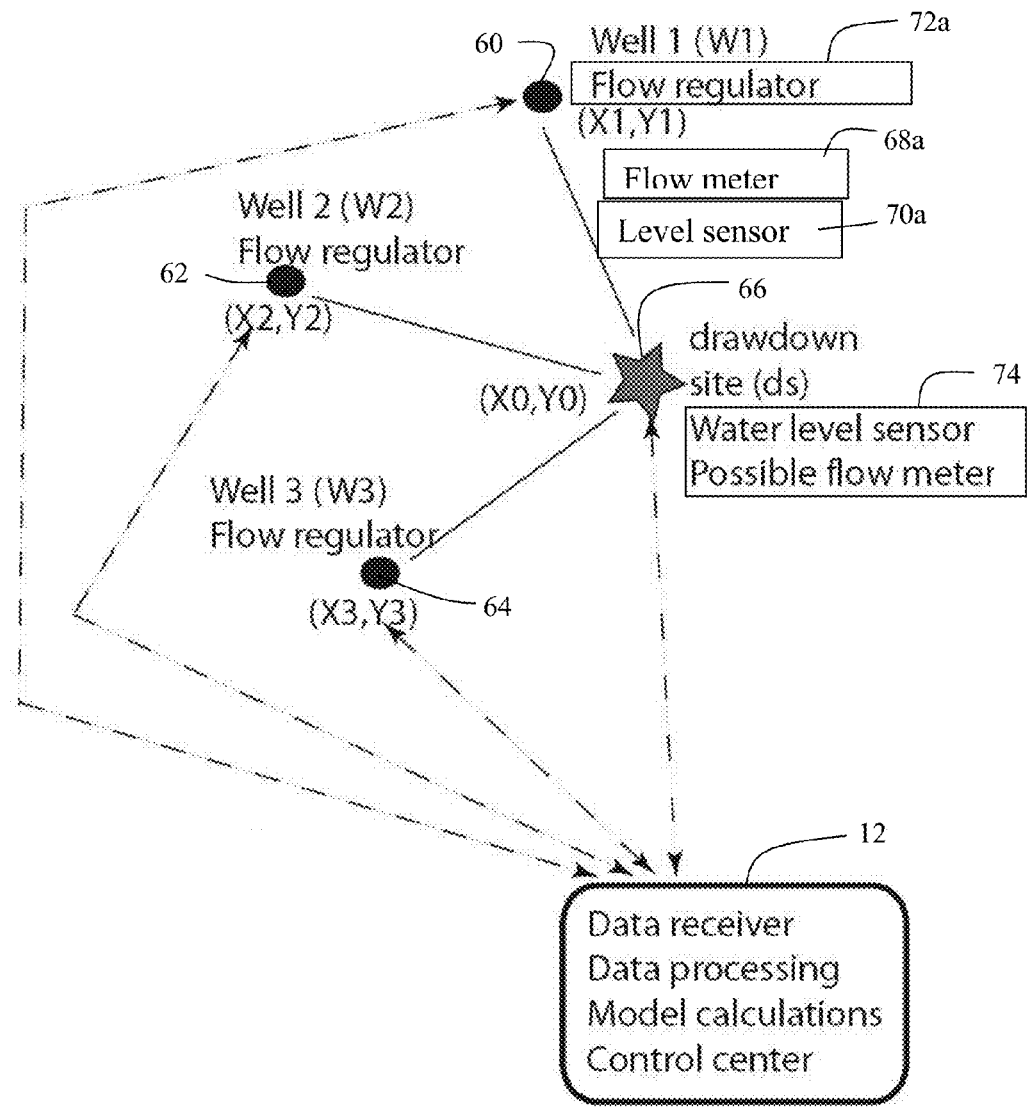
FIG. 3 is a block diagram of a second exemplary implementation for impact of multiple drawdown wells on a ground water table.

A second exemplary use of the system is shown in FIG. 3 wherein multiple wells 60, 62 and 64 interact through a common aquifer. The aquifer properties are measured at draw down site 66 which may employ a monitoring well. As in the prior example, each well incorporates a field sensor set that includes at least a level sensor 68a, 68b and 68c and flow meter 70a, 70b and 70c which may be a pumping rate monitor. A flow regulator 72a, 72b and 72c is employed for control feedback. The monitoring, well at the draw down site employs a field sensor set that includes a level sensor 74 and may include a flow meter with flow direction sensing in certain advanced embodiments. In alternative embodiments, when using the invention to protect from saltwater intrusion water level sensors are placed in several wells to determine the direction of flow near the salt-fresh water interface. If direction of flow is opposite to what is desired, this can serve as the tolerance modeled to in order to determine pumping logistics. The data from the field sensors is provided to the control center.

As previously described, the superposition of the effects of n nearby wells may be taken into account by the system. For implementation in one form of the exemplary embodiment, the system provides for n wells each with a constant pumping rate $Q_j$, j=1, 2, . . . , n located in a confined aquifer that has transmissivity T and storativity S as previously described. The pumping in the wells cause a drawdown $s_0$ at a specified location 0 in the aquifer. An exemplary constraint provides the allowable maximum drawdown at the location 0 (draw down site 66) is $s_{max}$.

The drawdown caused by well j at location 0 is determined in the exemplary embodiment by the equation as defined in Theis, Charles V. "The relation between the lowering of the piezometric surface and the rate and duration of discharge of a well using ground-water storage". Transactions, American Geophysical Union 16: 519-524 (1935), hereinafter Theis (1935):

$$s(r_j, t_j) = a_j Q$$

$$a_j = \frac{W(u_j)}{4\pi T} \quad j = 1, 2, \ldots n \tag{26}$$

in which the dimensionless variable $u_j$:

$$u_j = \frac{r_j^2 S}{4 t_j T} \tag{27}$$

where $r_j$ is the distance from well j to the location 0, and $t_j$ is the elapsed time since the j-th well started pumping. The well function $W(u_j)$ is defined as follows:

$$W(u_j) = -C - \ln(u_j) - \sum_{m=1}^{\infty} \frac{(-1)^m u_j^m}{m(m!)} \tag{28}$$

where C=0.577125 . . . The well function is approximated in the calculation of drawdown by the following expansion to its fourth-order term:

$$W(u_j) \cong -0.577125 - \ln(u_j) + u_j - \frac{u_j^2}{4} + \frac{u_j^3}{18} - \frac{u_j^4}{96} \tag{29}$$

To obtain pumping rates $Q_j$, j=1, 2, . . . , n that produce the allowable maximum drawdown at location 0, the following objective function is minimized with respect to the pumping rates and β (β is a Lagrange multiplier):

$$\text{Minimize } F = \sum_{j=1}^{n}(a_j Q_j - s_{max})^2 - 2\beta\left(\left(\sum_{j=1}^{n} a_j Q_j\right) - s_{max}\right) \tag{30}$$

Equation 30 for F is differentiated with respect to the pumping rates $Q_j$, j=1, 2, . . . , n and with respect to β, the resulting derivatives are equated to zero and solved with respect to $Q_j$, j=1, 2, . . . , n and produce the following pumping sustainable pumping rates:

$$Q_j = \frac{s_{max}}{n a_j} \quad j = 1, 2, \ldots, n \tag{31}$$

in which $a_j$ is calculated as follows:

$$a_j \cong \frac{-0.577125 - \ln(u_j) + u_j - \frac{u_j^2}{4} + \frac{u_j^3}{18} - \frac{u_j^4}{96}}{4\pi T} \tag{32}$$

Implementation in the exemplary embodiment is accomplished by entering the data: T, S, $s_{max}(r_j, t_j, j=1, 2, \ldots, n)$ as constraints in the system.

The variables $u_j$, j=1, 2, ..., n are then calculated as $$u_j = \frac{r_j^2 S}{4 t_j T} \quad (33)$$

And the coefficients $a_j$, j=1, 2, ..., n are calculated as:

$$a_j \cong \frac{-0.577125 - \ln(u_j) + u_j - \frac{u_j^2}{4} + \frac{u_j^3}{18} - \frac{u_j^4}{96}}{4\pi T} \quad (34)$$

The sustainable pumping rates for the wells are then calculated as $$Q_j = \frac{s_{max}}{n a_j} \quad j=1, 2, \ldots, n \quad (35)$$

A similar development for an unconfined aquifer is employed by the system using equations as defined by in Neuman, S. P., Analysis of pumping test data from anisotropic unconfined aquifers considering delayed gravity response, Water Resources Research, vol. 11, no. 2, pp. 329-342, (1975), hereinafter Neuman (1975).

Figure 4:
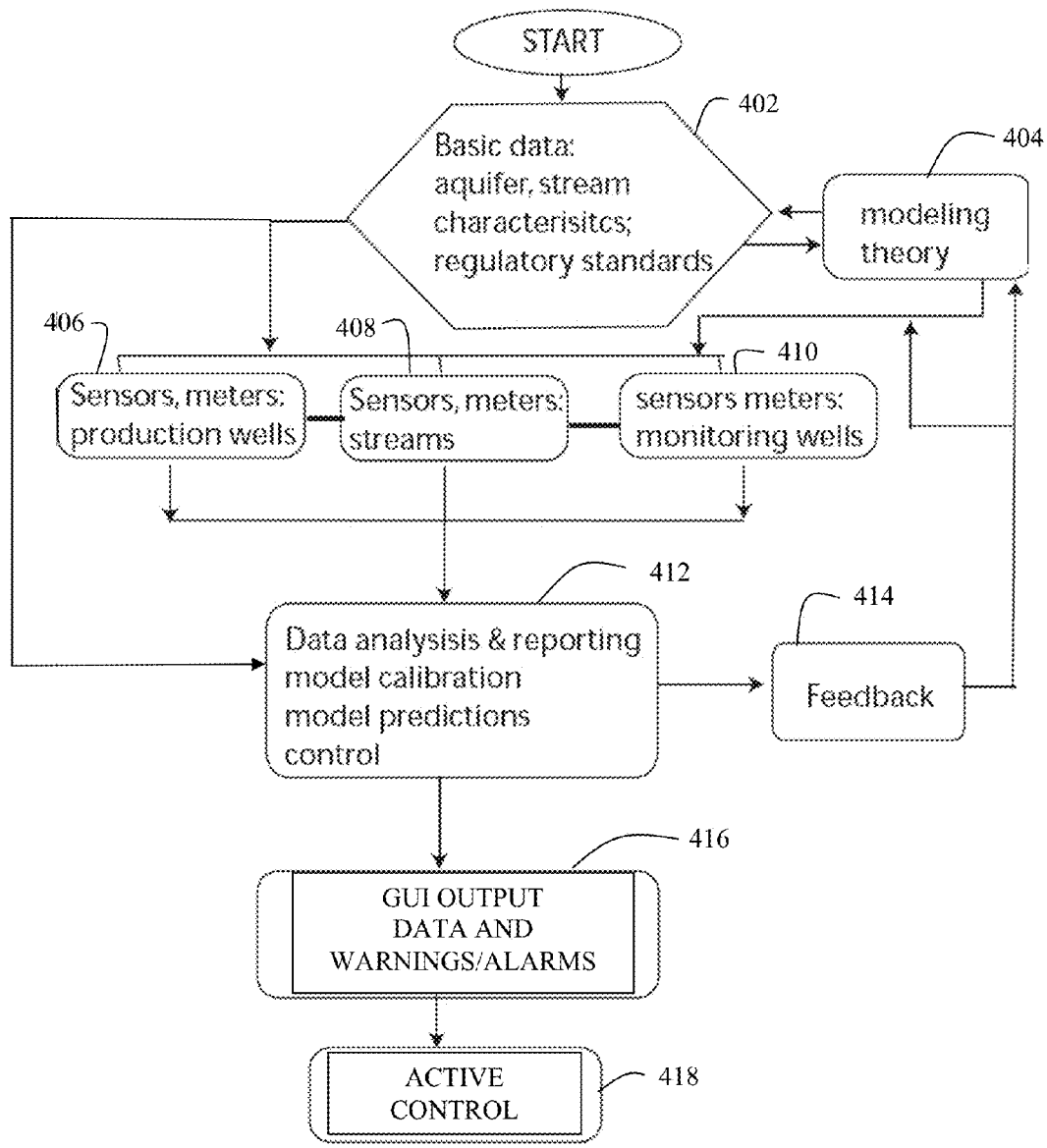
FIG. 4 is a flow chart of the operation of the functional control elements for a disclosed embodiment.

FIG. 4 shows basic elements of data flow for the exemplary embodiments of the invention presented herein. Basic data 402 for aquifer and stream characteristics as well as regulatory and protection or threshold requirements are entered as constraint sets and objective functions as described for the various embodiment above. This basic data is exchanged interactively with the modeling theory 404 employed in the interactive logic control module as will be described in greater detail subsequently. Field sensors and other measurement sources from production wells, streams and monitoring wells respectively provide input data 406, 408 and 410 to the interactive logic control module for data analysis and reporting, model calibration, model predictions and control 412. Feedback 414 is provided to update the modeling theory, as will be described in greater detail with respect to FIG. 7. Sensor data is entered into the model along with pre-measured values to determine amount of drawdown associated with each pumping well, then impact on the specific location (e.g., amount of water level reduction) is determined, upon which the data is plotted (e.g., as extraction rate versus sustainable extraction rate for that time step for each well). If a threshold is exceeded, this is displayed graphically and could be (but does not always have to be) integrated with a control module to reduce the extraction rate at a particular well that is pumping at an unsustainable rate. The output provided by the data analysis and reporting function is presented 416 for management decisions and recommendations including warning/alarms attributable to excess drawdown based on the constraint sets, objective functions and modeling theory. Active control 418 is implemented in advanced embodiments for automatic control of pumping rates or other affirmative output to well operators for required action. This could be in the form of automated e-mail advisories/directives or similar communications or automated reduction in pumping rates.

Figure 5A:
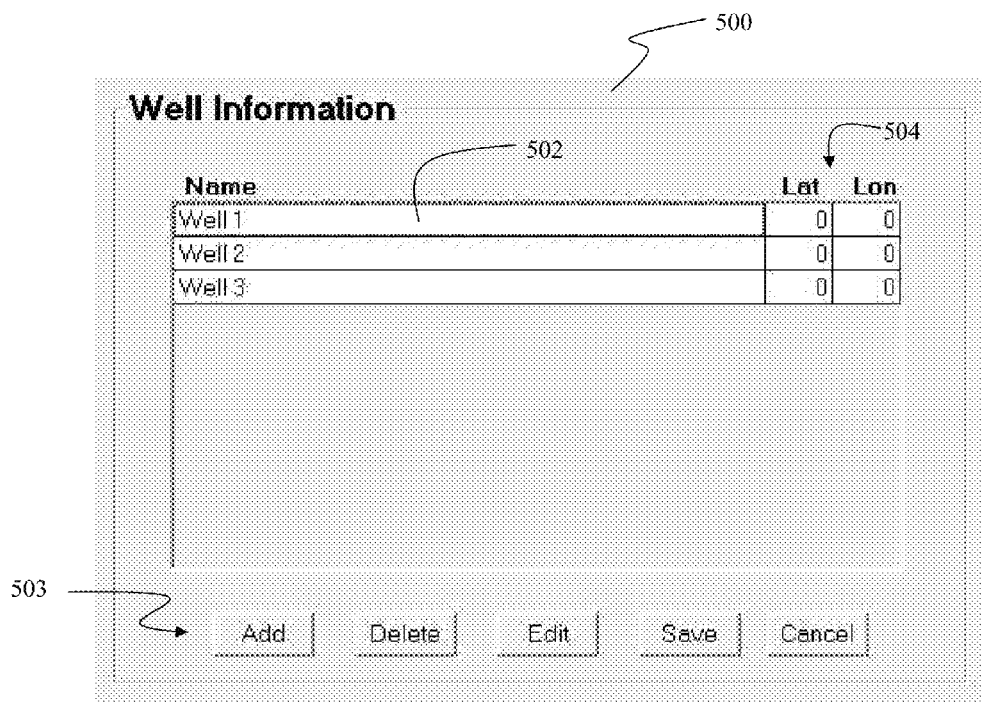
FIG. 5A is an example simulated screen shot of the Graphical User Interface (GUI) presentation of a Well information summary entry and display screen.

System interaction with the user for initial operating data and constraints input is accomplished using a Graphical User Interface (GUI) on display 20 with standard keyboard 21 or other input devices. For a system employing the first described embodiment for a stream/well interaction system, basic well identification is determined and entered into the system as shown in FIG. 5A on a Well Information page 500. For the example traced herein three wells are employed, however, the system may handle large numbers of monitoring sites as will be demonstrated subsequently. Wells are identified in name blocks 502 and can be added, deleted or edited with control buttons 503. Each name block has an associated position identifier 504 which is shown as latitude and longitude for the exemplary embodiment. This entry allows correlation with the GIS capability in the system.

Figure 5B:
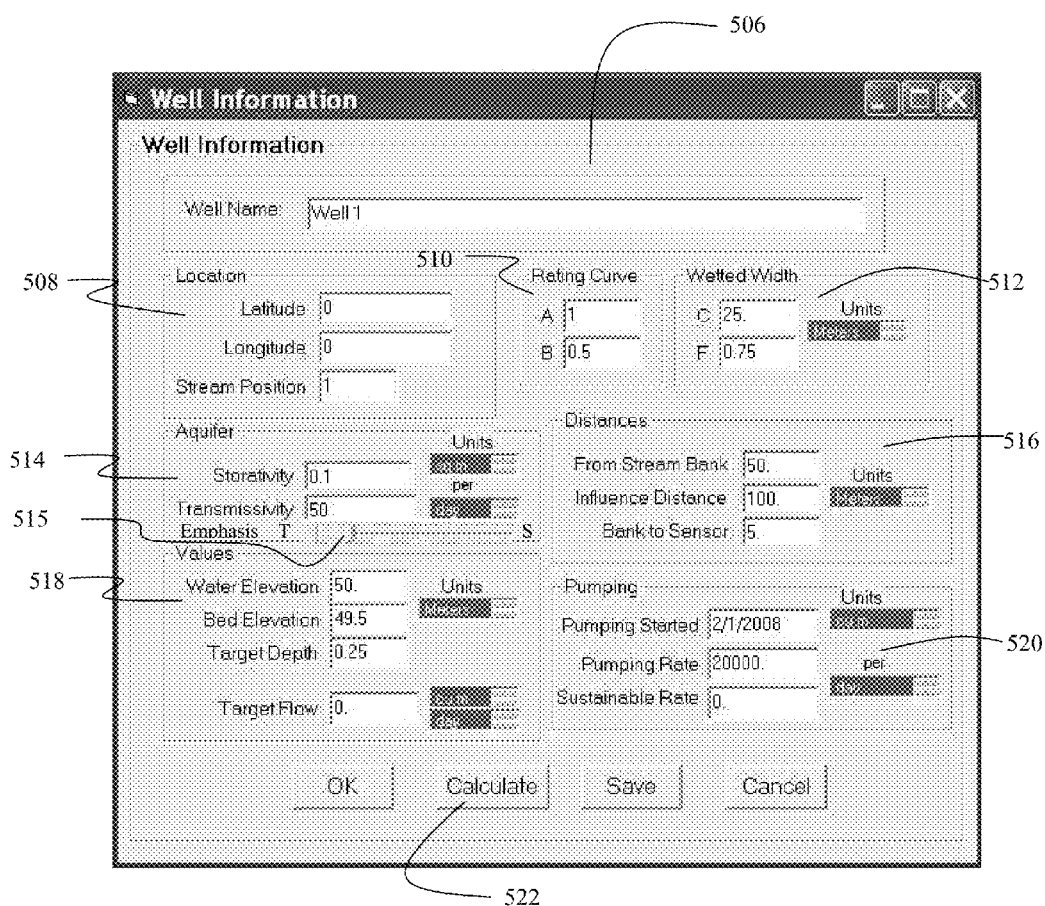
FIG. 5B is an example simulated screen shot of the GUI presentation of a detailed well information entry and display screen.

For each identified well in the Well Information page an expansion page 506 as shown in FIG. 5B is available. In a location block 508, latitude, longitude, and stream position are viewable/enterable. Stream position is an integer value, where 1 represents the most upstream position and each successive downstream well has its position increased by 1, the next downstream well has a value of 2, the next one is 3, and so on.

Constraint sets associated with each well are viewable/enterable. A rating curve block 510 includes values, A & B corresponding to a & b in equation (1). The wetted width block 512 includes values C & F corresponding to c & f in equation (2). The units can either be expressed in feet or meters. Aquifer values, storativity (S) and transmissivity (T) which are used in equation (5) are available in the Aquifer block 514. For subsequent correction of constraints, as discussed with respect to FIG. 4 above and in greater detail subsequently with respect to FIG. 7, a slider 515 is provided for the user to select or emphasize modification of the transmissivity (T) or storativity (S).

Distances block 516 provides the distance values for the well including the distance from stream bank (y*) for use in equation (4), the value for influence distance represented as L in equations 5, 6 & 7, and bank to sensor distance.

Values block 518 provides the water and bed elevation values used in equation (2) which calculates depth for comparison to the constraint of target depth. The target flow constraint is also provided. A target depth, or a target flow value may be employed to calculate the sustainable pumping rates. Either of these values can be used by the equations as described above. Volume units be expressed in gallons, liters, cubic feet, or cubic meters. Time units can be seconds, minutes, hours, or days. When the units are changed, the number is re-displayed for those units, while still corresponding to the same volume per time.

The last section is a pumping block 520 which provides operational data for pumping values associated with the well. The pump start date is used to calculate elapsed times, and the pumping rate may be entered and used in equation (6) as the value $Q_w$. Pumping rates can be expressed in the same volume and time units as shown above.

The sustainable rate for the displayed well is calculated, as will be described in greater detail subsequently, when the calculate button 522 is pressed, and expressed in the same units as the pumping rate.

Figure 5C:
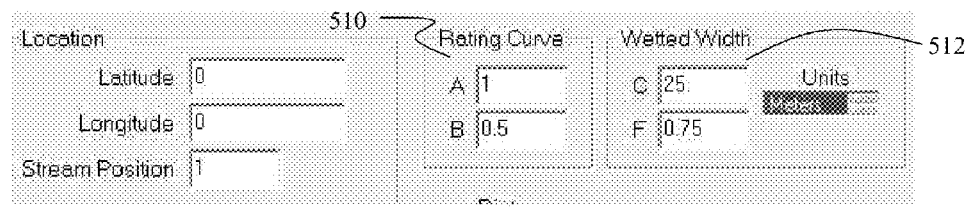
FIG. 5C is an example of the location, rating curve and wetted width information for an example well.

Demonstrating operation of the exemplary system using the three wells identified in the examples of FIGS. 5A and 5B, the same rating curve values are applied for each well and the rating curve 510 and wetted width 512 blocks with data that would be entered for each of the wells is shown in FIG. 5C. In actual practice individual wells will likely have different rating curves and wetted width data. Location data is not shown in FIG. 5C and may be manually entered for each well or my be automatically entered based on GIS data available.

Figure 5D:
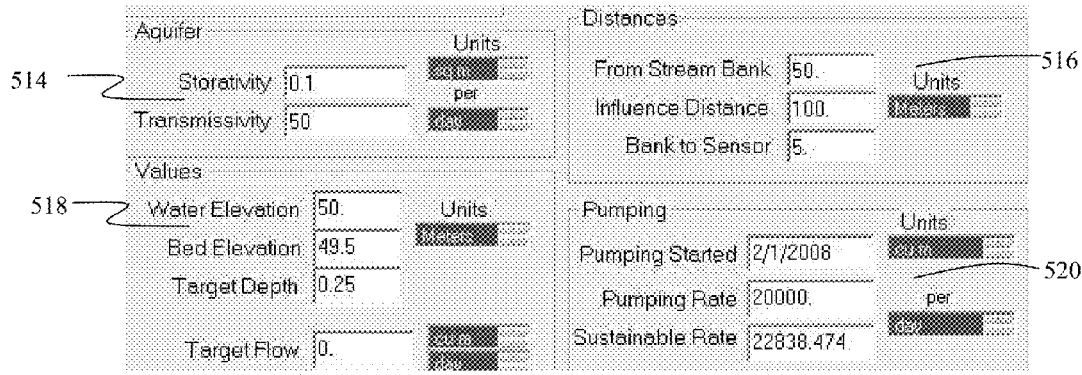

The remaining data for the Aquifer block 514, Distances block 516, Values block 518 and Pumping block 520 for each of the three wells is shown in FIGS. 5D, 5E and 5F respectively. While certain data is the same, other data, notably transmissivity associated with each well, is different.

Figure 5G:
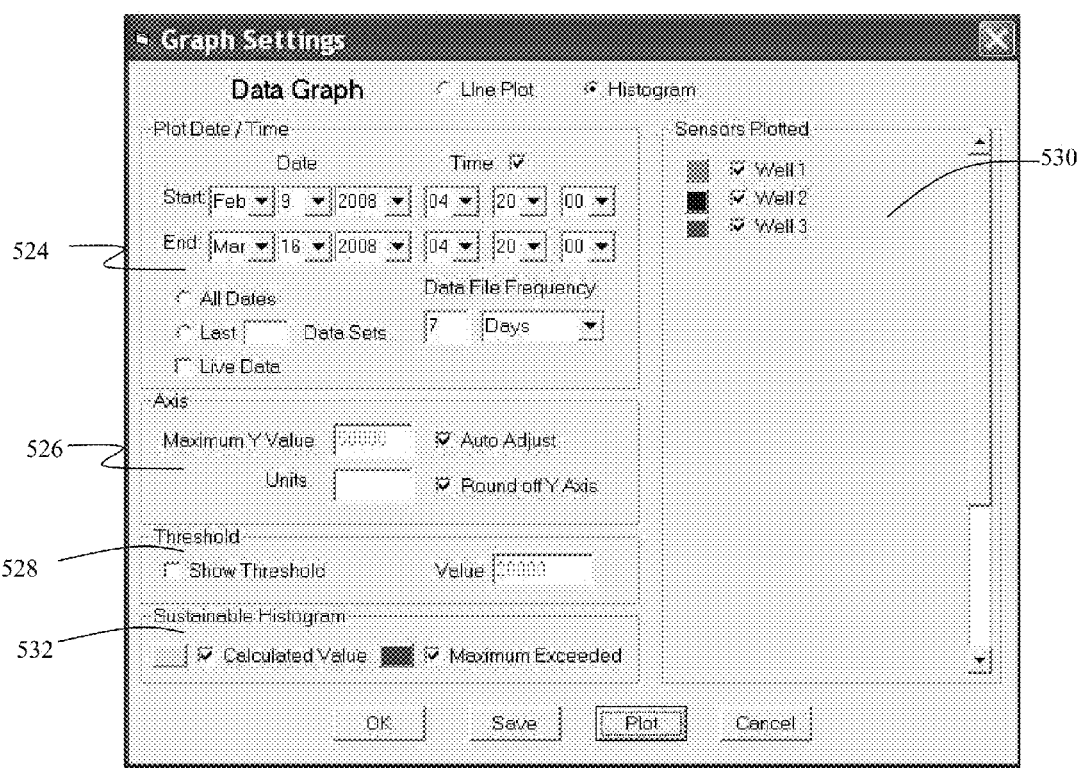
FIG. 5G is an example simulated screen shot of the GUI presentation of a graph settings page for the exemplary system implementation.

The GUI provides for display setup for the use with such parameters a Graph Settings page 522 shown in FIG. 5G. Graph settings include a plot date/time block 524 which allows selection of a range of dates for plotting, as will be described in greater detail subsequently. Graph axis information block 526 providing maximum values and units, threshold block 528 defining a value and visualization enablement, plotted sensors block 530 allowing selection of sensors to be viewed on the graphs and Sustainable histogram block 532 for visualization cues provide selection of the GUI output appearance for the user.

As defined for the example in the Graph Settings page of FIG. 5G, start & end dates for the plot, plot frequency, maximum Y axis values, colors for each well plot, sustainable values in the histogram are provided. Selection can be made to plot the data either in a line plot with values vs time, or a histogram where each well is shown in a bar graph along with the sustainable value, if desired.

For this example, all 3 wells are plotted in different colors, with a frequency of every 7 days. The sustainable value will be shown in yellow, and if the maximum sustainable value is exceeded, a red histogram for that well is shown. Histogram data is shown as selected in FIG. 5G.

Figure 5H:
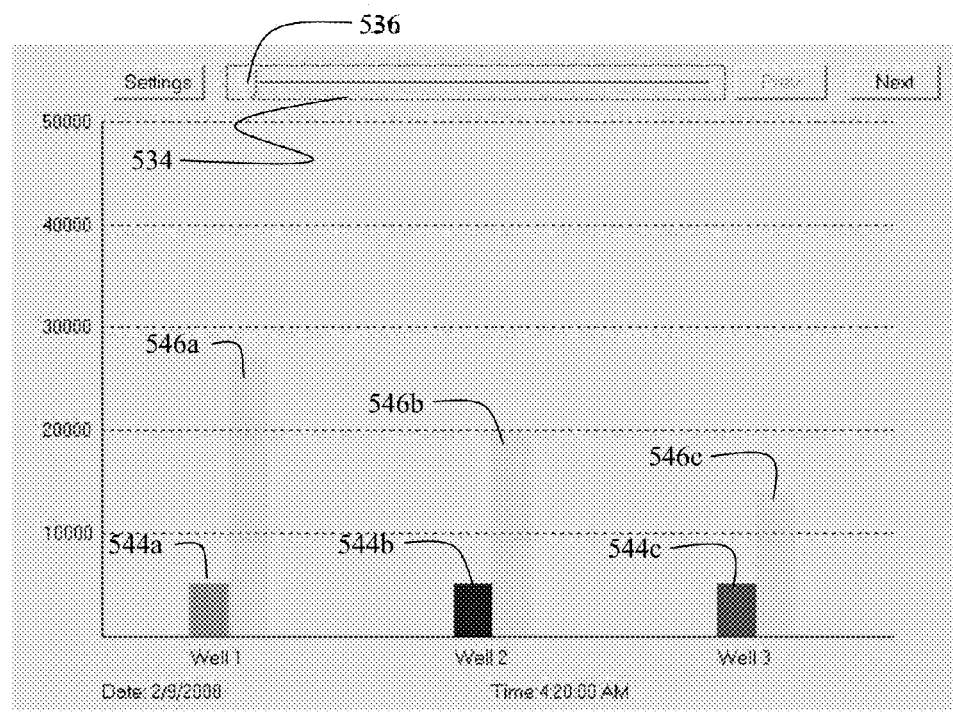
FIGS. 5H, 5J, 5K, 5L, 5M AND 5N are example histograms for the well system of the exemplary system implementation for a selected time series.
Figure 5J:
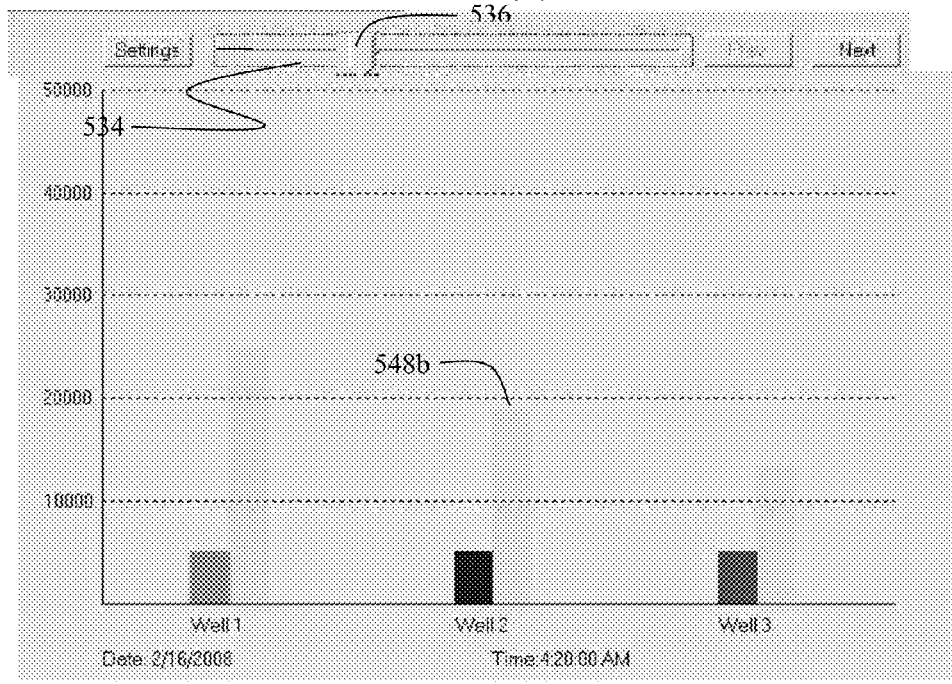
Figure 5K:
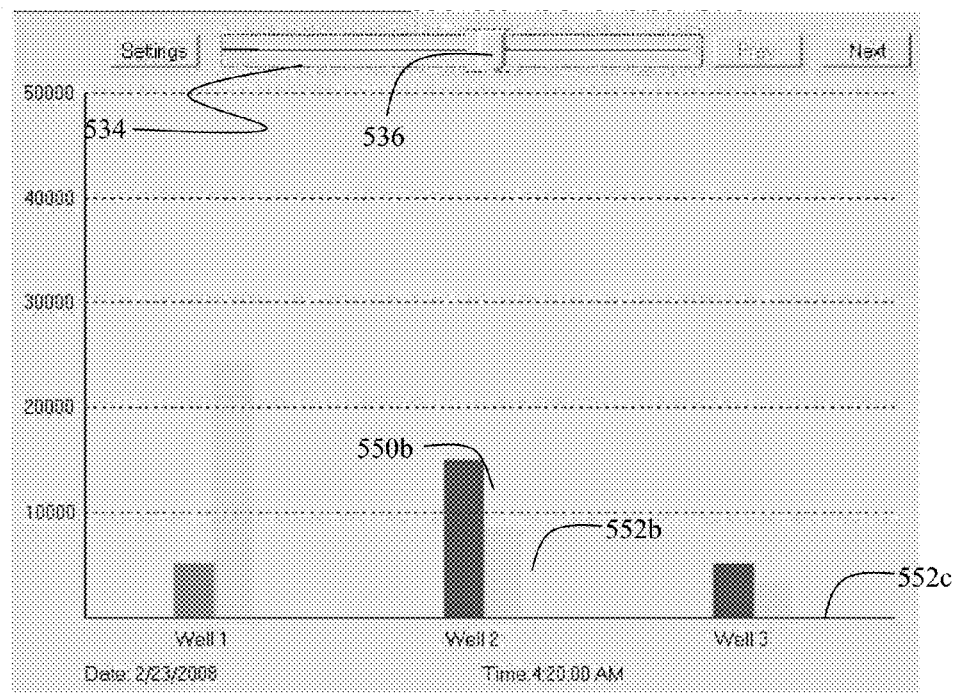

The histogram data for the time periods is shown in FIGS. 5H through 5N. A slider bar 534 is provided in the GUI for the user to select the date to be displayed. For example FIG. 5H is the initial date in the data sequence, Feb. 9, 2008. Moving the slider button 536 to the right selects the next date, Feb. 16, 2008 for display of data as shown in FIG. 5J.

If the selected date has passed, then actual sensor data from the field sensors will be present allowing population of the data fields with actual data. However, if the date has not yet passed, actual data will be employed to the current date and the system modeling will then provide calculated values to populate the various fields through the selected graph date.

For this example, the pumping rates of Wells 1 & 3 are steady pumping at a rate of 5000, while well 2 starts out at 5000 cu/m per day, increases to 15000 for 2/23 and 3/2 and then drops back to 10000 for 3/9 and 3/16. This is clearly seen in the Line Plot shown in FIG. 5P where trace 538 is well 2 and traces 540 and 542 are wells 1 and 3 (overlapping with identical pumping rates).

Figure 5L:
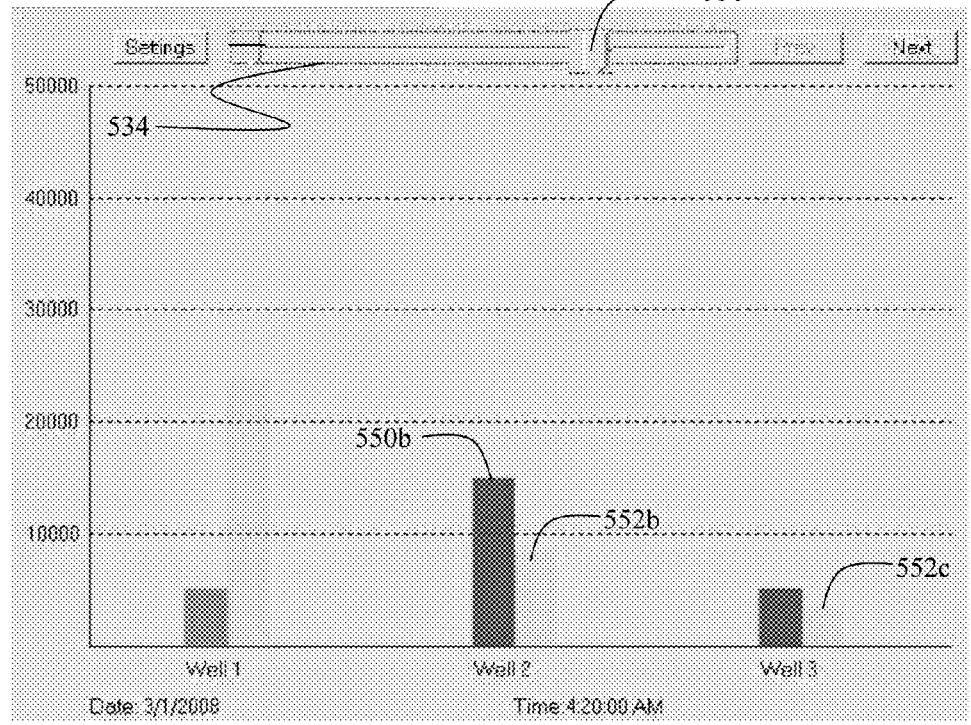
Figure 5M:
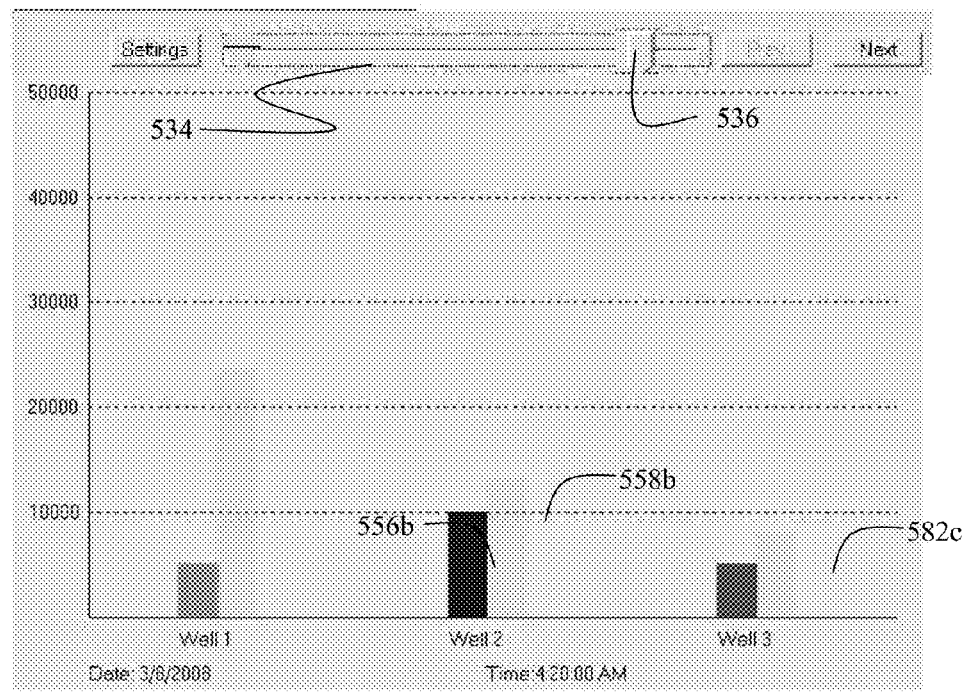
Figure 5N:
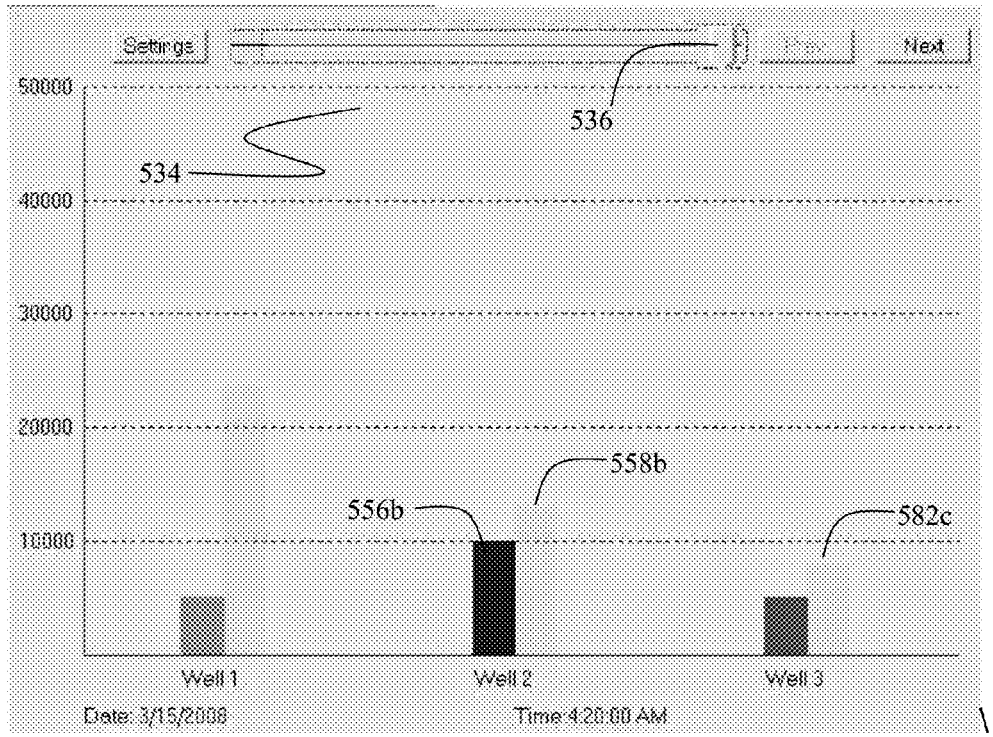
Figure 5P:
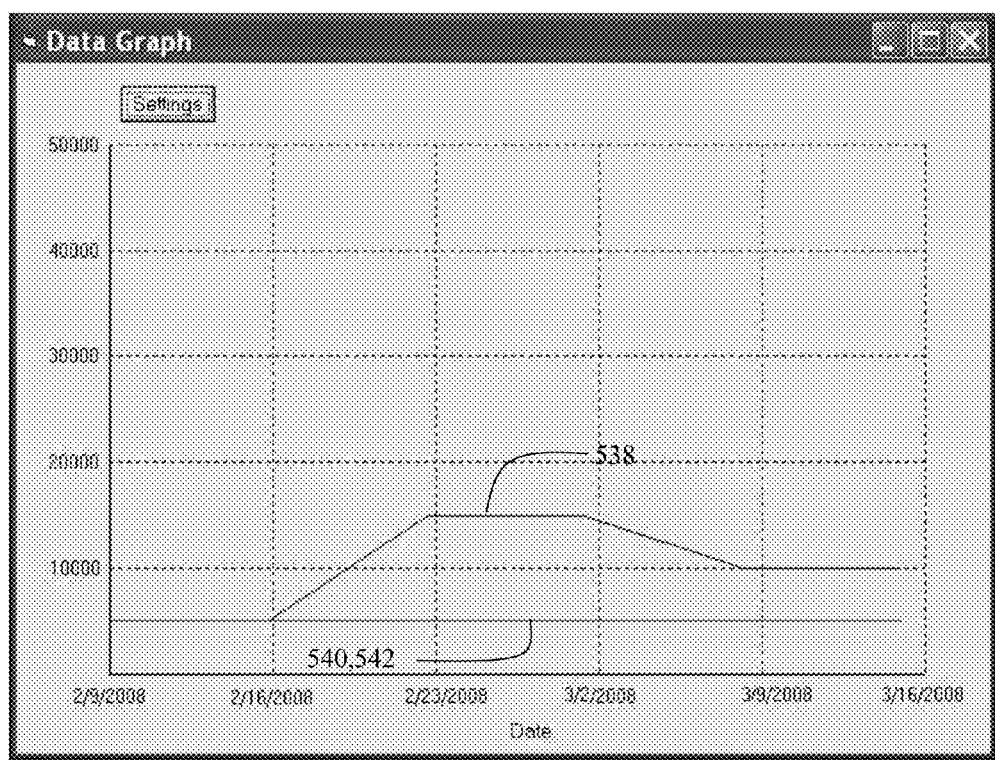
FIG. 5P is an example line data graph for the well system of the exemplary system implementation.

The initial data histogram in FIG. 5H on Feb. 9, 2008 shows all three wells with actual pumping rates, bars 544a, 544b and 544c well below calculated sustainable values 546a, 546b and 546c. FIG. 5J for the next date of Feb. 16, 2008 shows identical pumping rates for the three wells. However, a slight decline in calculated sustainable rate 548b for well 2 is shown. With the increase in pumping rate of well 2, bar 550b shown in FIG. 5K on Feb. 23, 2008 the sustainable rate is exceeded and the new calculated sustainable rate, bar 552b is lower. Well 3 as down stream from well 2 is also now exceeding its sustainable rate, bar 552c, even though it did not change its pumping rate. This demonstrates the superposition effects of the wells on one another as well as the stream. As shown in FIG. 5L with no change in pumping rates, wells 2 and 3 remain exceeding the sustainable rates. However, with a reduction in pumping on well 2 (not all the way back to its original value but to a value approaching the calculated sustainable rate of FIG. 5L), FIG. 5M shows that the pumping rate of well 2, bar 556b, reducing to 10000 cu/m per day and the calculated sustainable rates for both wells 2 and 3, bars 558b and 558c, respectively now exceed the actual rates.

Figure 6:
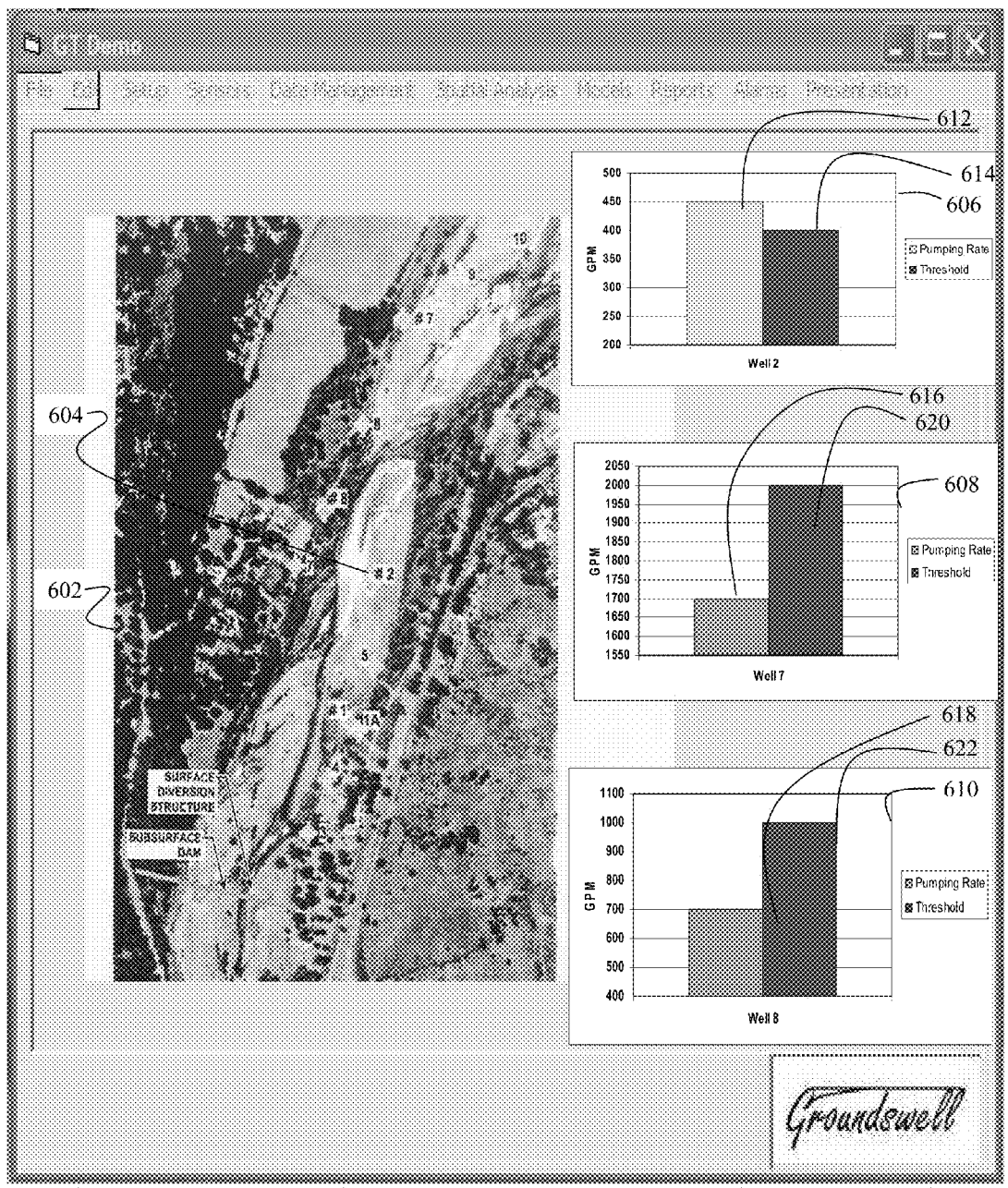
FIG. 6 is a simulated screen shot of a summary screen with GIS data information and summary histogram plots.

A top level format for output such as that shown in FIG. 6 is provided as a portion of the GUI on display 20 for the exemplary embodiments which incorporates both the histogram format and GIS location information for visualization of the well system. A general digital map overview 602 such as that available in GIS systems of the aquifer/well or well/stream system is provided showing the location and physical relationship of the various elements such as wells 604. Graphical data presentations 606, 608 and 610 determined by the data analysis and reporting function are provided for each element, i.e. for each well. In the example shown, well 2 is exceeding its sustainable threshold with pumping rate 612 compared to modeled limitation 614 with warning/alarm functionality shown in, for example, a distinctive color such as yellow or red. Wells 7 and 8 have pumping rates 616 and 618, respectively, which are within their modeled limitations or sustainable values 620 and 622.

Alternative embodiments include additional decision support quality information integrated with controllers to automatically respond to conditions. For instance, if a groundwater extraction rate is deemed unsustainable based on model feedback, automatic the reduction in extraction rates is accomplished through a supervisory control and data acquisition (SCADA) system.

Figure 7A:
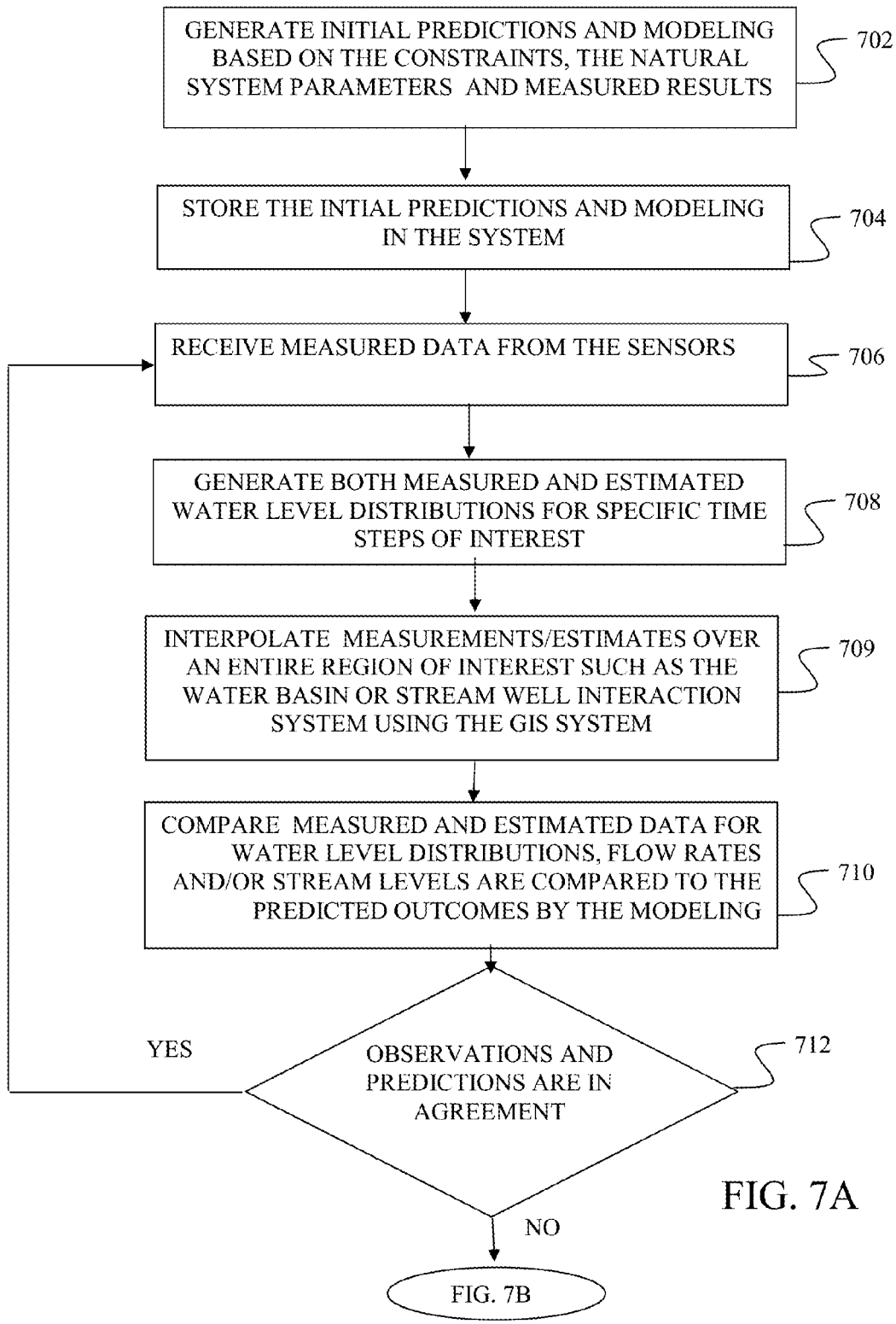
FIGS. 7A and 7B are a flow chart of an exemplary constraints calculator operation for the disclosed embodiments.
Figure 7B:
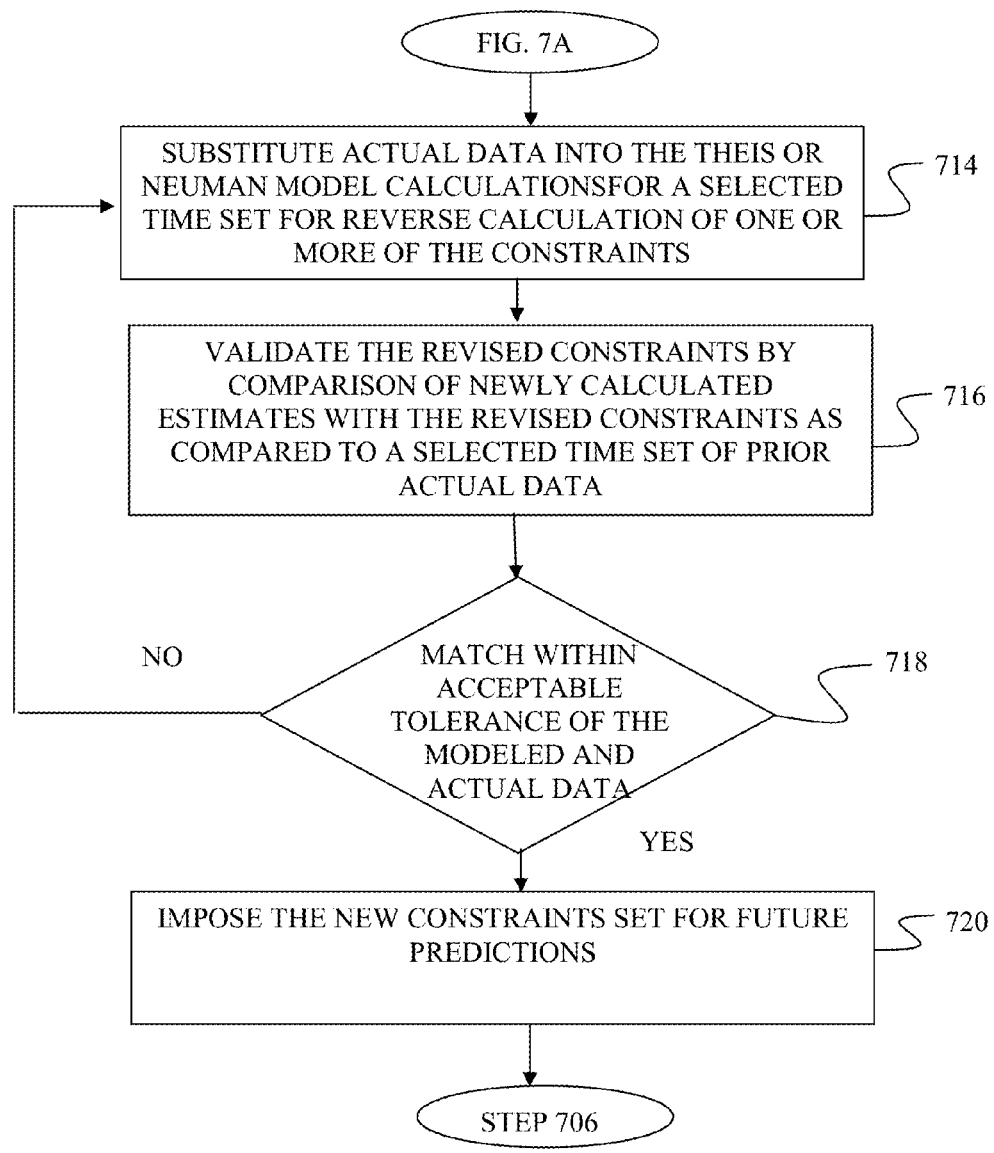

The disclosed embodiments provide for feedback 414 based on actual data received for correction of the modeling constraints as described previously with respect to FIG. 4. As shown in FIG. 7, initial predictions and modeling based on the constraints, the natural system parameters (such as transmissivity and storativity) and measured results are generated, step 702, and are stored by the system. step 704, as previously described. Measured data from the sensors is received, step 706, and both measured and estimated water level distributions are generated, step 708 for specific time steps of interest. The GIS system allows interpolation of those measurements/estimates over an entire region of interest such as the water basin or stream well interaction system of the exemplary embodiments, step 709.

While pumping rates have been employed for the exemplary description, water level and stream flow rates, in the stream/well interaction system and water level distributions in the water basin system, for example, are also measured by the sensors in the system not only at active wells but at measurement wells and other sites.

On a continuous basis, predetermined interval or upon selection by the user, a comparison of measured and estimated (modeled) water level distributions, flow rates and/or stream levels are compared to the predicted outcomes by the modeling, step 710. A determination is then made if observations and predictions are in agreement within an acceptable error tolerance, step 712. If so, then no changes are made to the constraints sets and modeling and data collection continues. For an exemplary embodiment, revision of constraint parameters would be effected whenever predicted values differ more than plus or minus 5% from measured values. The US Geological Survey, for example, considers measurements that are within plus or minus 5% of "truth" to be excellent and it is anticipated that expectations of field to be be any closer than that error threshold of 5% would be unreasonable.

If, however, observations do not sufficiently agree with predictions, substituting actual data into the Theis (1935) or Neuman (1975) model calculations described above for a selected time set for reverse calculation of one or more of the constraints, T and S as exemplary, is accomplished, step 714. Validation of the revised constraints is then accomplished by comparison of newly calculated estimates with the revised constraints as compared to a selected time set of prior actual data, step 716. Steps 714 and 716 may be iterated as needed to establish a match within acceptable tolerance of the modeled and actual data, step 718. The adjustment of T and S for an exemplary implementation is based on the minimization of the sum of square deviations between measured values of withdrawn flow "q" and the theoretical equation for "q" given in equation (5) and that involves T and S. The minimization of the sum of squared deviations is done by nonlinear optimization in which, starting with values of T and S used in the previous period in which "q" was estimated, T and S are changed using a two-dimensional Newton-Raphson search method until convergence to optimal values of T and S is achieved. Selection by the user of an emphasis on T or S for creating convergence of the search method may be accomplished with controls such as that described with respect to FIG. 5B. The new constraints set is then imposed for future predictions, step 720.

In one exemplary embodiment for the interactive control logic, an algorithm based on Game Theory such as that disclosed by Nash. J. F., "Equilibrium points in n-person games" Proceedings of the National Academy of Sciences of the U.S.A., 36, 48-491950 and Nash, J. F., "Non-cooperative games." Annals of Mathematics, 54, 286-295, (1951) is employed to derive modeling strategies that would provide sustainability. General application of game theory is employed for competitive activities (games) in which each participating party chooses an individual strategy that affects all the other parties taking part in the game. The participants can be non-cooperative or cooperative. In a non-cooperative scenario each party chooses strategy which is best for itself, without regards to societal or someone else's welfare. In a cooperative scenario parties may act in unison to improve their joint payoffs.

As employed with respect to embodiments of the present system, non-cooperative usage is exemplified by overdraft of a water-bearing zone adjacent to a river, thereby depleting the river of volume and ecologic functionality. This scenario arises when at least one ground water user neglects the externalities of his adopted ground water pumping strategy. In general, non-cooperative behavior results from lack of consideration regarding the interactions between the localized surface and ground water resources due to lack of information. The embodiments disclosed herein specifically make information available which may eliminate non-cooperative operation.

For a cooperative scenario, equilibrium arises when ground water users respect environmental constraints and consider mutual impacts. This allows users to derive economic and environmental benefits from ground water and habitat indefinitely—sustainability. To obtain this result, information and an adaptive approach based on dynamic data tracking is required and can be supplied by the system disclosed herein.

More specifically, when aquifer properties and extraction well characteristics are known, the algorithm can be used to estimate the water level, or potentiometric surface, at any location within the domain of an investigation. This powerful concept allows a determination of pumping thresholds for single and multi-well extraction systems in order to maintain target water levels within a natural water-bearing system. A partial list of applications includes: stream and river stage protection, cooperative ground water extraction strategy development, and protection from seawater intrusion.

The objective functions are selected for the system based on cooperative and non-cooperative parameters and may, for example, be defined to maximize economic benefit to the well operators while maintaining sustainability of the aquifer or riparian system being monitored.

Applying game theory as the interactive logic control module modeling approach for n wells (n is an integer equal to or larger than 1) each extracting groundwater at a rate $Q_k$, k=1, 2, 3, . . . , n. The quadratic linearly constrained game-theory formulation of groundwater extraction control results in a problem of the form:

Maximize $Q^T G Q + Q^T z + c$
w.r.t. Q
subject to: $B Q <= b$ in which Q is a vector of pumping rates, T denotes "transpose", G is a matrix of optimizing coefficients, z is a vector of aquifer data values, and c is a scalar that depends on aquifer conditions. B is matrix of constraints, and b is a vector of regulatory values imposed on drawdowns.

This problem is solved for the vector of pumping rates Q, which comply with restrictions to be met at an impact location such as another well in an aquifer or a hydraulically connected stream as provided in the exemplary embodiments discussed above. Qk is then determined for each well by solving the quadratic problem state above. For the exemplary output defined in FIG. 6, this calculated Qk is presented as the modeled limitation for each well while measured actual flow rates provide the comparison data as described. In the case of well-stream interaction, the algorithm to predict stream depletion is based on an analytical solution of the radial flow equation with a stream acting as a head-boundary condition

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A real-time automated system for resource usage optimization for water well water monitoring comprising:
    a plurality of automatically controlled sensor suites monitoring flow rates and levels of multiple extraction wells and aquifer replenishment sources including at least one monitoring well proximate the extraction wells;
    a computer system having
    GIS data processing algorithms;
    a control module incorporating an interactive logic, operating in conjunction with the GIS data processing algorithms and receiving as an input an objective function set, said control module further incorporating resource and constraint sets, the objective function set operable in the interactive logic allowing maximizing of water withdrawal capability in a most economically efficient manner by multiple users while avoiding salt water intrusion into a well from overdraw conditions and the constraint sets include response of the aquifer modeled from static data including historical permeability and storage capacity, flow rates and water table level history;
    said control module receiving data monitored by the sensor suites;
    said control module comparing the received data to the constraint sets;
    a report/alarm for action responsive to the control module upon impact to the objective function set; and,
    a constraints set calculator responsive to the comparison by the control module for providing the sensor suite input data for update of the constraint sets.

2. The real-time automated system for resource usage optimization for water well water monitoring as defined in claim 1 wherein game theory is employed as the interactive logic to establish optimum flow rates within limitations of the constraint sets.

3. The real-time automated system for resource usage optimization for water well water monitoring as defined in claim 2 wherein flow rate monitoring accomplished at a selected one of the multiple extraction wells is employed to validate/update the constraint sets for the Game Theory for closed loop operation.

4. The real-time automated system for resource usage optimization for water well water monitoring as defined in claim 1 further wherein the control module provides automatic adjustment of pumping rates based on model output where an impact to an element of the objective function set is exceeding a predetermined threshold.

5. A real-time system automated for resource usage optimization for assuring a river water level minimum associated with multiple extraction wells drawn upon for use by multiple users comprising:
a plurality of automatically controlled sensor suites monitoring flow rates and levels of multiple extraction wells proximate a river and river water level;
a computer system having
spatial data processing algorithms;
a control module incorporating an interactive logic, operating in conjunction with the spatial data processing algorithms and receiving as an input an objective function set for the use by resource and constraint sets, the objective functions operating in the interactive logic allowing maximizing water withdrawal capability in the most economically efficient manner by multiple users while avoiding reduction of river water level below a predetermined minimum from overdraw conditions and the constraint sets include response of the river level modeled from static data including historical permeability and storage capacity, flow rates and water table level history;
said control module receiving data monitored by the sensor suites;
said control module comparing the received data to the constraint sets;
a report/alarm responsive to said control module for action upon exceeding a threshold of any element of the objective function set;
said control module providing automatic adjustment of pumping rates based on a model output and whether thresholds have been exceeded; and,
a constraints set calculator responsive to the comparing of received data to the constraint sets by the control module and providing the sensor suite input data for update of the constraint sets for remodeling of interactive logic calculations.

6. The real-time automated system for resource usage optimization for assuring river level as defined in claim 5 wherein a radial flow equation with constant head boundary condition is employed as the interactive logic to establish the optimum flow rates for the desired economic maximization.

7. The real-time automated system for resource usage optimization for assuring river level as defined in claim 6 wherein flow rate monitoring accomplished at the withdrawal well and level monitoring of the river is employed to validate/update the constraints sets for the radial flow equation wherein the constant head boundary condition is solved for closed loop operation.

8. A method for real-time automated resource usage optimization comprising:
providing a plurality of automatically controlled sensor suites at active wells and monitoring wells;
providing a computer system having spatial data processing algorithms and a control module incorporating an interactive logic,
operating the control module in conjunction with the spatial data processing algorithms;
receiving as an input an objective function set for use of constraint sets, said constraint sets including a saltwater intrusion constraint associated with direction of flow near a salt-fresh water interface and an associated water level;
receiving data monitored by the sensor suites;
comparing the received data to the constraint sets;
presenting data for user review in a graphical user interface (GUI);
creating a report/alarm for action upon exceeding a threshold of any element of the objective function set; and,
recalculating the constraints set responsive to the comparison of received data and constraint sets using the sensor suite input data for update of the constraint sets for remodeling of interactive logic calculations.

9. The method of claim 8 wherein the step of recalculating comprises:
generating initial predictions and modeling based on the constraint sets, and data monitored by the sensor suites;
storing the initial predictions and modeling in the system with received data monitored by the sensor suites;
generating both measured and estimated water level distributions for specific time steps of interest;
interpolating the measured and estimated water level distributions over an entire water basin or stream well interaction system using the spatial data processing algorithms;
comparing measured and estimated water level distributions and comparing flow rates and/or stream levels to the initial predictions;
determining if measured and estimated water level distructions are in agreement within an acceptable error tolerance;
if so, continuing receiving data monitored by the sensor suites;
if not, substituting actual received data monitored by the sensor suites into Theis or Neuman model calculations for a selected time set for reverse calculation of one or more of constraints in the constraint sets as revised constraints;
validating the revised constraints by comparison of newly calculated estimates with the revised constraints as compared to a selected time set of prior actual received data monitored by the sensor suites;
iterating as needed to establish a match within acceptable tolerance of the calculated estimates and actual received data monitored by the sensor suites;
imposing the new constraints set for future predictions.

10. The method of claim 9 wherein transmissivity (T) and storativity (S) are constraints in the constraint sets and the step of substituting actual data results in reverse calculation of T and S.

11. The method of claim 8 wherein pumping rates, water level and stream flow rates, and water level distributions are measured by the sensors in the system at active wells, at measurement wells.

12. The method of claim 10 wherein the step of substituting actual received data monitored by the sensor suites comprises:
minimizing the sum of square deviations between measured values of withdrawn flow wherein the objective function set involves T and S;

said minimizing of the sum of squared deviations accomplished by nonlinear optimization in which, starting with values of T and S used in the aprevious period in which withdrawn flow was estimated, T and S are changed using a two-dimensional Newton-Raphson search method until convergence to optimal values of T and S is achieved.

13. The method of claim 12 wherein an emphasis on T or S is selected for creating convergence of the search method with GUI controls.

14. The method of claim 8 further comprising:
determining a time period for data selection for the step of presenting; and,
presenting interpolated measurements/estimates in that time period in a user selectable format.

15. The method of claim 14 wherein the step of determining a time period constitutes adjusting a slider in the GUI controls.

16. The method of claim 14 wherein the user selectable format is a histogram of selected wells.

17. The method of claim 16 wherein graphical display of well location is provided.

18. The method of claim 8 wherein the interactive logic comprises game theory and the step of updating the constraint set assumptions comprises the steps of:
maximizing QT G Q+QT z+c with respect to Q subject to: B Q<=b;
defining flow rate for each well.

19. A real-time system automated for resource usage optimization for assuring a river water level minimum associated with multiple extraction wells drawn upon for use by multiple users comprising:
a plurality of automatically controlled sensor suites monitoring flow rates and levels of multiple extraction wells proximate a river and river water level;
a computer system having
spatial data processing algorithms;
a control module incorporating an interactive logic, operating in conjunction with the spatial data processing algorithms and receiving as an input an objective function set for the use by resource and constraint sets, the objective functions operating in the interactive logic allowing maximizing water withdrawal capability in the most economically efficient manner by multiple users while avoiding reduction of river water level below a predetermined minimum from overdraw conditions and the constraint sets include response of the river level modeled from static data including historical transmissivity, T, and storativity, S:
said control module receiving data monitored by the sensor suites;
said control module comparing the received data to the constraint sets;
a report/alarm responsive to said control module for action upon exceeding a threshold of any element of the objective function set;
said control module providing automatic adjustment of pumping rates, q, wherein $$q = Q_w \frac{2y^*}{\pi} \int_0^L \frac{e^{-\left(\frac{x^2+y^{*2}}{4\frac{T}{S}t}\right)}}{x^2+y^{*2}} dx; \text{ and,}$$

a constraints set calculator responsive to the comparing of received data to the constraint sets by the control module and providing the sensor suite input data for update of the constraint sets for remodeling of interactive logic calculations.

* * * * *